United States Patent [19]

Johoji et al.

[11] Patent Number: 6,084,046
[45] Date of Patent: Jul. 4, 2000

[54] COPOLYMER AND COPOLYMER COMPOSITION

[75] Inventors: Hirofumi Johoji; Tsuyoshi Takei; Tadaaki Nishiyama, all of Chiba, Japan

[73] Assignee: Sumitomo Chemical Company, Limted, Osaka, Japan

[21] Appl. No.: 09/020,848

[22] Filed: Feb. 9, 1998

[30] Foreign Application Priority Data

Feb. 13, 1997 [JP] Japan ................................. 9-028742
Oct. 6, 1997 [JP] Japan ................................. 9-272481

[51] Int. Cl.$^7$ ........................ C08F 236/04; C08F 4/643
[52] U.S. Cl. ...................... 526/339; 526/126; 526/127; 526/132; 526/133; 526/134; 526/153; 526/160; 526/170; 526/308; 526/309; 526/250; 526/295; 526/905; 524/574
[58] Field of Search ..................... 526/308, 339, 526/340, 347, 160, 170, 126, 127, 132, 133, 134, 153, 250, 295, 309; 524/574

[56] References Cited

U.S. PATENT DOCUMENTS

| | | | |
|---|---|---|---|
| 2,995,543 | 8/1961 | Williams | 526/308 |
| 5,229,478 | 7/1993 | Floyd et al. | 526/160 |
| 5,260,394 | 11/1993 | Tazaki et al. | 526/308 X |
| 5,739,225 | 4/1998 | Tazaki et al. | 526/340 X |
| 5,792,824 | 8/1998 | Natori et al. | 526/347 X |

FOREIGN PATENT DOCUMENTS

| | | |
|---|---|---|
| 0 842 939 | 5/1998 | European Pat. Off. . |
| 1-501633 | 3/1988 | Japan . |
| 59-108008 | 6/1989 | Japan . |
| 2-64111 | 3/1990 | Japan . |

*Primary Examiner*—Fred Teskin
*Attorney, Agent, or Firm*—Pillsbury Madison & Sutro Intellectual Property Group

[57] ABSTRACT

A random copolymer comprising ethylene, an α-olefin and a branched conjugated polyvalent olefin, wherein (i) ethylene, the α-olefin and an iodine value respectively satisfy the following inequalities: 0<ethylene<100 (% by mol), 0<α-olefin<100 (% by mol) and 0<iodine value<370 (g/100 g), (ii) an intrinsic viscosity [η] measured in decalin at 135° C. of the random copolymer satisfies the following inequality: 0.1 (dl/g)<[η]<10 (dl/g) and (iii) a molecular weight distribution (Mw/Mn)≦5.

25 Claims, No Drawings

COPOLYMER AND COPOLYMER COMPOSITION

BACKGROUND OF THE INVENTION

1. Field of the Invention

The present invention relates to a novel copolymer comprising ethylene-α-olefin-branched conjugated polyvalent olefin, a composition containing the copolymer, a crosslinkable composition and a crosslinked copolymer composition, more particularly a crosslinkable composition having sufficient vulcanization rate without using an expensive diene monomer and, furthermore, a crosslinked copolymer composition obtained by crosslinking the crosslinkable copolymer composition, which is superior in heat deterioration resistance, weathering resistance, ozone resistance, chemical resistance and low-temperature characteristics, and a novel copolymer used therein.

2. Description of the Related Art

An ethylene-propylene-non-conjugated diene copolymer (EPDM) is superior in weathering resistance, ozone resistance and heat deterioration resistance because of no double bond in the backbone chain of the molecular structure, and it has hitherto been used exclusively in the usage to which the heat resistance and weathering resistance are required, e.g. weather stripping, door glass channel, radiator horse, waterproof sheet, antivibration engine mount, etc. by making the best use of its characteristics.

As is known to the public, EPDM is a crosslinkable copolymer obtained by copolymerizing an expensive non-conjugated diene monomer such as 5-ethylidne-2-norbornene, etc. with EPM (ethylene-propylene copolymer) which has no double bond in the backbone chain in the molecular structure and is not capable of performing the crosslinking reaction. Particularly considering the crosslinking rate and crosslinking density among practical characteristics, use of the expensive non-conjugated diene monomer was essential.

On the other hand, as a cheap conjugated polyvalent olefin, for example, there are conjugated monomers including 1,3-butadiene, isoprene, etc. It is known that some copolymers comprising ethylene and a conjugated diolefin, or propylene and the conjugated diolefin could be obtained by using a catalyst system containing vanadium which is known to be usefull for the industrial production of some kind of copolymers. However it is known that these techniques have a problem of causing a drastic decrease in activity or a drastic decrease in molecular weight of the polymer. On the other hand, a method of producing a copolymer comprising ethylene, an α-olefin and a conjugated diene, particularly branched conjugated polyvalent olefin (e.g. isoprene, etc.) and a copolymer having an uniform composition distribution of an α-olefin are not known.

Although a method for the production of copolymer comprising an olefin and a conjugated diene by using a catalyst system known as the industrially usefull one for the production of an olefin resin such as polyethylene, polypropylene, etc. and which also contains titanium compound and a magnesium compound as one component (Japanese Patent Kokai Publication No. 108008/1984) is laid open. As is apparent from the Examples of the method described in said patent, the resulting copolymer has broad molecular weight distribution and composition distribution (specifically, it means that a crystalline polymer and a non-crystalline polymer are simultaneously produced). For example, when the solution polymerization is carried out with the catalyst described above, clogging of piping was brought about by the insoluble polymer having high ethylene content which was formed during the polymerization reaction as byproduct, and this make the continuous production impossible. In addition, generally copolymer having broad composition distribution was applied to the many usage, for instance when used as the film, etc., however there arose a problem such as decrease in strength, increase in bleed component, stickiness caused by an increase of the extractable substance. Alternatively, when used as a low-density rubber, there arose a problem about practical physical properties, for example, it shows only poor physical characteristics such as compression permanent strain, tensile rigidity, etc. even after crosslinking.

On the other hand, recently high-molecular weight EPDM containing non-conjugated diolefin as a third component and which has low crystallinity and narrow molecular weight distribution/narrow composition distribution, which was produced by using a catalyst system comprising a transition metal compound and aluminoxane and also a method for the production process of the same in high efficiency (Japanese Patent Kokai Publication No. 64111/1990) have been suggested. Furthermore, as the copolymer using a conjugated diolefin as the raw material (Japanese Patent Kokai Publication No. 501633/1989), a crystalline copolymer having a cyclopentene ring structure on the backbone chain, which is derived from butadiene and ethylene using a specific metallocene catalyst, is also disclosed, but any information suggesting a method of producing a copolymer comprising an ethylene-α-olefin-branched conjugated polyvalent olefin having narrow molecular weight distribution/composition distribution, a copolymer obtained by the method, not to speak of the properties of the resulting copolymer and a crosslinked copolymer composition derived from said copolymer are not disclosed.

Under these circumstances, the present applicant has previously suggested a method of producing an olefin (co) polymer using a catalyst containing a transition metal complex having a specific ligand and, furthermore, a method of producing a copolymer of a high-molecular weight ethylene-α-olefin-diene using the catalyst (Japanese Patent Application No. 185081/1996). Thereafter, the present inventors have intensively studied. As a result, it has been found, that a copolymer of the ethylene-α-ethylene-branched conjugated polyvalent olefin (particularly a high-molecular weight ethylene-α-olefin-branched conjugated polyvalent olefin copolymer), which has never been obtained by using a conventional catalyst, is obtained by using the previously suggested catalyst. More in detail, it has been found that a high-molecular weight copolymer of ethylene-α-olefin-isoprene could be obtained and a crosslinkable copolymer composition comprising the copolymer and a crosslinking agent shows sufficient crosslinking rate in comparison with a crosslinkable copolymer composition produced by using a conventional expensive non-conjugated diolefin and, furthermore, a crosslinked copolymer composition shows superior stability for the deterioration by heating than conventional EPDM copolymer using expensive non-conjugated diene as third component. Thus, the present invention has been accomplished.

SUMMARY OF THE INVENTION

An object of the present invention is to provide a novel ethylene-α-olefin-branched conjugated polyvalent olefin copolymer having narrow molecular weight distribution/ composition distribution, a crosslinkable composition comprising the copolymer and at least one crosslinking agent which shows superior crosslinking rate, and crosslinked copolymer composition having excellent heat reterioration resistance which was obtained by the crosslinking of the said crosslinkable composition.

The ethylene-α-olefin-branched conjugated polyvalent olefin copolymer of the present invention is a random copolymer comprising ethylene, an α-olefin and a branched conjugated polyvalent olefin monomer, wherein (i) ethylene, the α-olefin and an iodine value respectively satisfy the following inequalities 0<ethylene<100 (% by mol), 0<α-olefin<100 (% by mol) and 0<iodine value<370 (g/100 g), (ii) an intrinsic viscosity [η] measured in Tetralin™ (tetrahydronaphthalene), at 135° C. of the random copolymer satisfies the following inequality: 0.1 (dl/g)<[η]<10 (dl/g) and (iii) a molecular weight distribution (Mw/Mn)≦5.

DETAILED DESCRIPTION OF THE INVENTION

The ethylene-α-olefin-branched conjugated polyvalent olefin copolymer, crosslinkable composition containing the same and crosslinked copolymer composition obtained by crosslinking the said composition will be described in detail hereinafter.

The ethylene-α-olefin-branched conjugated polyvalent olefin copolymer in present invention is a random copolymer obtainable by the copolymerization of ethylene, an α-olefin and the branched conjugated polyvalent olefin.

The α-olefin used in the production of the copolymer of the present invention is the α-olefin having the carbon atoms of 3–20, and specific examples thereof include propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 1-octene, 1-decene, styrene, 1-tetradecene, 1-hexadecene, 1-octadecene, 1-eicocene etc.; and alkyl-substituted styrene compounds such as α-methylstyrene, 2-methylstyrene, 3-methylstyrene, 4-methylstyrene, 2-ethylstyrene, 3-ethylstyrene, 4-ethylstyrene, etc. Among them, a α-olefin having carbon atoms of 3–10 is preferable, and specific examples thereof include propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 1-octene, 1-decene, styrene, α-methylstyrene, 2-methylstyrene, 3-methylstyrene, 4-methylstyrene, 2-ethylstyrene, 3-ethylstyrene, 4-ethylstyrene, etc. Among them, an aliphatic unsaturated hydrocarbon having carbon atoms of 3–10 is more preferable, and specific examples thereof include propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 1-octene, 1-decene etc. Furthermore, α-olefins may be used by itself or in combination thereof.

Examples of the branched conjugated polyvalent olefin used in the production of the copolymer of the present invention include 2-methyl-1,3-butadiene, 2-ethyl-1,3-butadiene, 2-propyl-1,3-butadiene, 2-isopropyl-1,3-butadiene, 2-hexyl-1,3-butadiene, 2,3-dimethyl-1,3-butadiene, 2,3-diethyl-1,3-butadiene, 2-methyl-1,3-pentadiene, 2-methyl-1,3-hexadiene, 2-methyl-1,3-octadiene, 2-methyl-1,3-decadiene, 2,3-dimethyl-1,3-pentadiene, 2,3-dimethyl-1,3-hexadiene, 2,3-dimethyl-1,3-octadiene, 2,3-dimethyl-1,3-decadiene, 2-methyl-1,3-cyclopentadiene, 2-methyl-1,3-cyclohexadiene, 2,3-dimethyl-1,3-cyclopentadiene, 2,3-dimethyl-1,3-cyclohexadiene, 2-chloro-1,3-butadiene, 2,3-dichloro-1,3-butadiene, 1-fluoro-1,3-butadiene, 2-chloro-1,3-pentadiene, 2-chloro-1,3-cyclopentadiene, 2-chloro-1,3-cyclohexadiene and the like.

Among them, 2-methyl-1,3-butadiene, 2-ethyl-1,3-butadiene, 2-propyl-1,3-butadiene, 2-isopropyl-1,3-butadiene, 2-hexyl-1,3-butadiene, 2,3-dimethyl-1,3-butadiene, 2,3-diethyl-1,3-butadiene, 2-methyl-1,3-pentadiene, 2-methyl-1,3-hexadiene, 2-methyl-1,3-octadiene, 2-methyl-1,3-decadiene, 2,3-dimethyl-1,3-pentadiene, 2,3-dimethyl-1,3-hexadiene, 2,3-dimethyl-1,3-octadiene, 2,3-dimethyl-1,3-decadiene, 2-methyl-1,3-cyclopentadiene, 2-methyl-1,3-cyclohexadiene, 2,3-dimethyl-1,3-cyclopentadiene and 2,3-dimethyl-1,3-cyclohexadiene are preferable and 2-methyl-1,3-butadiene, 2-ethyl-1,3-butadiene, 2-propyl-1,3-butadiene, 2-isopropyl-1,3-butadiene, 2-hexyl-1,3-butadiene, 2,3-dimethyl-1,3-butadiene, 2,3-diethyl-1,3-butadiene, 2-methyl-1,3-pentadiene, 2-methyl-1,3-hexadiene, 2-methyl- 1,3-octadiene and 2-methyl-1,3-decadiene are particularly preferable, but are not limited to these compounds.

The ethylene-α-olefin-branched conjugated polyvalent olefin copolymer of the present invention is a copolymer having narrow composition distribution obtained by copolymerizing ethylene, an α-olefin and a branched conjugated polyvalent olefin, wherein (i) ethylene, the α-olefin and an iodine value respectively satisfy the following expressions: 0<ethylene<100 (% by mol), 0<α-olefin<100 (% by mol) and 0<iodine value<370 (g/100 g), (ii) an intrinsic viscosity [η] measured in Tetralin™ (tetrahydronaphthalene) at 135° C. of the random copolymer rubber (1) satisfies the following expression: 0.1 (dl/g)<[η]<10 (dl/g) and (iii) a molecular weight distribution (Mw/Mn)≦5.0, preferably 3.5 (Mw: weight average molecular weight, Mn: number average molecular weight). The narrowness in the composition distribution of the copolymer obtained in present invention, more strictingly speaking, narrow intermolecular composition distribution, of the present invention could be easily understood also by remarkable narrowness in molecular weight distribution of polymer obtained in present invention, specifically Mw/Mn≦3, as shown in the Examples of the present invention. Furthermore, it is also strongly supported by the Examples of the present invention that is, when a copolymer containing only smaller amount of α-olefin is synthesized, obtained copolymer shows only one melt peak in DSC (differential scanning calorimetry) measurement, smaller crystallinity, and significantly narrow molecular weight distribution (Mw/Mn). It is widely known that such a copolymer is superior in practical characteristics such as low-temperature flexibility, tensile strength and stickness (e.g. bleeding, etc.).

More particularly, the ethylene-α-olefin-branched conjugated polyvalent olefin copolymer of the present invention is a copolymer obtained by copolymerizing ethylene, an α-olefin and a branched conjugated polyvalent olefin in the presence of a catalyst containing the specific complex of the group IV transition metal, preferably a transition metal complex described in Japanese Patent Application No. 185081/1996 filed previously by the present applicant, i.e. a catalyst containing a particular complex represented by the following general formula. The copolymer of the present invention is a random copolymer having wide characteristics from crystalline to non-crystalline which could be regulated by the content of each component. Although the content of each component is not specifically limited in this invention, in case that it is used as crystalline copolymer, the content of α-olefin satisfies preferably 0<α-olefin<20% by mol, more preferably 0<α-olefin<15% by mol and the content of ethylene satisfies preferably 80<ethylene<100% by mol, more preferably 85<ethylene<100% by mol. When it is used as the non-crystalline copolymer, the content of α-olefin satisfies generally 15<α-olefin<100% by mol, preferably 20<α-olefin<100% by mol and the content of ethylene satisfies generally 0<ethylene<85% by mol, preferably 0<ethylene<80% by mol. In view of the crosslinking reaction, the composition of 0<iodine value<370 is preferably used, more preferably 0<iodine value<250, further more preferably 0<iodine value<100. The molecular weight is not also limited, but [η] satisfies generally 0.1<[η]<10. From the view point of mechanical strength, [η] satisfies preferably 0.3<[η]<10, more preferably 0.5<[η]<10. The molecular weight distribution satisfies the following expression Mw/Mn≦5.0, preferably Mw/Mn≦3.5, in view of the strength of the resulting crystalline copolymer or low-temperature flexibility of the non-crystalline

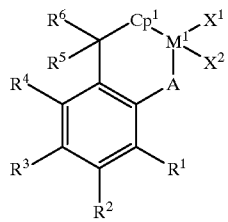

(1)

wherein $M^1$ represents a transition metal atom of the group 4 in the Periodic Table of the Elements; A represents an atom of the group 16 in the Periodic Table of the Elements; B represents an atom of the group 14 in the Periodic Table of the Elements; $Cp^1$ represents a group having a cyclopentadiene type anion skeleton; $X^1$, $X^2$, $R^1$, $R^2$, $R^3$, $R^4$, $R^5$ and $R^6$ independently represent a hydrogen atom, a halogen atom, an alkyl group having carbon atoms of 1–20 which may be substituted with a halogen atom, an aralkyl group having carbon atoms of 7–20 which may be substituted with a halogen atom, an aryl group having carbon atoms of 6–20 which may be substituted with a halogen atom, a substituted silyl group having carbon atoms of 1–20 which may be substituted with a halogen atom, an alkoxy group having carbon atoms of 1–20 which may be substituted with a halogen atom, an aralkyloxy group having carbon atoms of 7–20 which may be substituted with a halogen atom, an aryloxy group having carbon atoms of 6–20 which may be substituted with a halogen atom, or a disubstituted amino group having carbon atoms 2–20; and $R^1$, $R^2$, $R^3$, $R^4$, $R^5$ and $R^6$ may be combined optionally to form a ring.

The crosslinkable copolymer composition of the present invention is a crosslinking composition comprising a random copolymer and at least one crosslinking agent, wherein a random copolymer comprises ethylene, an α-olefin and a branched conjugated polyvalent olefin, wherein (i) ethylene, the α-olefin and an iodine value respectively satisfy the following expressions: 0<ethylene<100 (% by mol), 0<α-olefin<100 (% by mol) and 0<iodine value<370 (g/100 g), (ii) an intrinsic viscosity [η] measured in Tetralin™ (tetrahydronaphthalene) at 135° C. of the random copolymer rubber (1) satisfies the following expression: 0.1 (dl/g)<[η] <10 (dl/g) and (iii) Mw/Mn≦5.0, preferably Mw/Mn≦3.5, and at least one crosslinking agent. The crosslinking copolymer composition is preferably a crosslinking copolymer composition wherein the copolymer is obtained by copolymerizing ethylene, an α-olefin and a branched conjugated polyvalent olefin in the presence of the catalyst suggested previously by the present inventors, i.e. a catalyst obtainable by using a complex represented by the following general formula, more preferably a non-crystalline copolymer, a crosslinking composition and a crosslinked copolymer composition obtained by copolymerizing the crosslinking composition, wherein the α-olefin content satisfies 20<α-olefin<100% by mol. The crosslinkable copolymer composition of the present invention can accomplish the same crosslinking rate as that of a crosslinkable composition composed of a conventional copolymer using an expensive diene monomer component. Furthermore, the crosslinked copolymer obtained by the crosslinking reaction is superior in heat deterioration resistance to a crosslinked copolymer using an expensive diene monomer, and hardly causes heat curing.

As the crosslinking agent which can be used in the crosslinking composition, one or more crosslinking agents can be selected optionally from various crosslinking agents according to the usage, and examples of the crosslinking agent include sulfur crosslinking agents, inorganic crosslinking agents, polyamine crosslinking agents, resin crosslinking agents, sulfur compound crosslinking agents, oximenitrosoamine crosslinking agents, organic peroxide crosslinking agents and other crosslinking agents. Specific examples of the sulfur crosslinking agent include powdered sulfur, precipitated sulfur, colloidal sulfur, surface-treated sulfur, insoluble sulfur, non-contaminating sulfur. donor, etc.; specific examples of the inorganic crosslinking agent include selenium, tellurium, magnesium oxide, litharge (lead monoxide), zinc white, etc.; specific examples of the polyamine crosslinking agent include hexamethylenediamine, triethylenetetramine, tetraethylenepentamine, hexamethylenediamine carbamate, N,N'-dicinnamylidene-1,6-hexanediamine, 4,4'-methylenebis(cyclohexylamine)carbamate, 4,4'-methylenebis-(2-chloroaniline), etc.; specific examples of the resin crosslinking agent include alkylphenol formaldehyde resin, melamine-formaldehyde condensate, triazine-formaldehyde condensate, sulfur-P-tert-butyl phenol resin, alkylphenol sulfide resin, hexamethoxymethylmelamine resin, etc.; specific examples of the sulfur compound crosslinking agent include sulfur monochloride, sulfur dichloride, morpholine disulfide, alkylphenol disulfide, polymeric polysulfate, vulcanizing accelerator containing sulfur, etc.; specific examples of the oxime-nitrosoamine crosslinking agent include p-quinonedioxime, p,p'-dibenzoylquinonedioxime, tetarchloro-p-benzoquinone, poly-p-dinitrosobenzene, etc.; specific examples of the organic peroxide crosslinking agent include tert-butyl hydroperoxide, 1,1,3,3-tetramethylbutyl hydroperoxide, p-menthane hydroperoxide, cumene hydroperoxide, diisopropylbenzene hydroperoxide, 2,5-dimethylhexane 2,5-dihydroperoxide, di-tert-butyl peroxide, dicumyl peroxide, tert-butylcumyl peroxide, 1,1-bis(tert-butylperoxy) cyclododecane, 2,2-bis(tert-butylperoxy)octane, 1,1-di-tert-butylperoxycyclohexane, 2,5-dimethyl-2,5-di(tert-butylperoxy)hexane, 2,5-dimethyl-2,5-di(tert-butylperoxy) hexyne-3,1,3-bis(tert-butylperoxyisopropyl)benzene, 2,5-dimethyl-2,5-di(benzoylperoxy)hexane, 1,1-bis(tert-butylperoxy)-3,3,5-trimethylcyclohexane, n-butyl-4,4-bis (tert-butylperoxy)valerate, benzoyl peroxide, m-toluyl peroxide, p-chlorobenzoyl peroxide, 2,4-dichlorobenzoyl peroxide, tert-butylperoxy isobutyrate, tert-butylperoxy 2-ethylhexanoate, tert-butylperoxy benzoate, tert-butylperoxy isopropylcarbonate, tert-butylperoxy allylcarbonate, acrylic crosslinking agent, etc.; and specific examples of the other crosslinking agent include ethylene glycol dimethacrylate, trimethylolpropane trimethacrylate, polyfunctional methacrylate monomer, polyhydric alcohol methacrylate, acrylate, N,N'-m-phenylene dimaleimide, ammonium benzoate, silica filler-containing monomer, triallyl isocyanurate, metal-containing monomer, zinc methacrylate, magnesium methacrylate, zinc dimethacrylate, magnesium dimethacrylate, 2,4,6-trimercapto-S-triazine, N,N'-bis(2-methyl-2-nitropropyl)-1, 6-hexanediamine, isocyanuric acid, thiadiazole derivative, cationic activator, special mixed vulcanizer, high purity industrial soap, etc. These crosslinking agents are selected optionally according to the usage. An amount of the crosslinking agent added is also selected optionally according to the required characteristics of the crosslinked article, but is generally from about 0.1 to 30 parts by weight, preferably from about 0.5 to 10 parts by weight.

The crosslinked copolymer of the present invention can be obtained by crosslinking the above crosslinkable copolymer composition. The crosslinking reaction of the crosslinkable composition can be conducted normally at 120 to 270° C. for 1 minute to 3 hours under various conditions such as air atmosphere, inert atmosphere, steam atmosphere, etc. according to the kind of the crosslinking agent, using a known method such as press vulcanization, batch vulcanization, continuous vulcanization and the like.

In case of the crosslinking reaction, various known (Handbook of Rubber & Plastic Blended Drug, Revised Edition 2, published by Rubber Digest Co.) additives can be added previously to control the crosslinkability and to control the physical properties of the resulting crosslinked article. Examples of the additive include vulcanization accelerators, supplement vulcanization accelerators, activators, scorch retarders, antiaging agents, antioxidants, antiozonants, ultraviolet absorbers, photostabilizers, mastication accelerators, tackifiers, plasticizers, rubber softeners, rubber reinforcers, fillers, reinforcers, blowing agents, supplement blowing agents, lubricants, slip additives, internal releasants, anti-fogging agents, frame retardants, antistatic agents for incorporation, colorants, couplers, preservatives, fungicides and the like. Specific examples of the respective additives described in a known literature (Handbook of Rubber & Plastic Blended Drug, Revised Edition 2, published by Rubber Digest Co.) or a part of the classification will be shown below. Specific examples of the vulcanization accelerator include compounds of the classification, such as guanidine, aldehyde-ammonia, aldehyde-amine, thiazole, sulfamineamide, thiourea, thiuram, dithiocarbamate, xantate, etc.; specific examples of the supplement vulcanization accelerator-activator include compounds such as metal oxide, metal carbonate, fatty acid and a derivative thereof, amines, etc.; specific examples of the scorch retarder include organic acid, nitroso compound, etc.; specific examples of the antiaging agent-antioxidant-antiozonant include naphthylamine, diphenylamine, p-phenylenediamine, quinoline, hydroquinone derivative, monophenol, bisphenol, trisphenol, thiobisphenol, hindered phenol, phosphite, wax, copper inhibitor, etc.; specific examples of the ultraviolet absorber-photostabilizer include salicylic acid derivative, benzophenone, benzotriazole, hindered amine, etc.; specific examples of the mastication accelerator include a mixture of pentachlorothiophenol and an active additive, zinc salt of pentachlorothiphenol, mixed diallyl disulfide, etc.; specific examples of the tackifier include coumarone-indene resin, phenol-aldehyde resin, xylene, formaldehyde resin, polyterpene resin, petroleum hydrocarbon resin, rosinate, etc.; specific examples of the plasticizer include phthalic acid derivative, isophthalic acid derivative, tetrahydrophthalic acid derivative, adipic acid derivative, azelaic acid derivative, sebacic acid derivative, dodecane-2-acid derivative, maleic acid derivative, fumaric acid derivative, trimellitic acid derivative, pyromellitic acid derivative, citric acid derivative, itaconic acid derivative, oleic acid derivative, ricinoleic acid derivative, stearic acid derivative, other fatty acid derivative, sulfonic acid derivative, phosphoric acid derivative, glutaric acid derivative, monoester plastizer, glycol derivative, glycerin derivative, paraffin derivative, epoxy derivative, polyester, polyether, poly-α-methylstyrene, low-molecular weight polystyrene, liquid polychloroprene, depolymerized rubber, etc.; specific examples of the rubber softener include mineral oil softener, vegetable oil softener, factice fatty acid and fatty acid salt, etc.; specific examples of the rubber reinforcer include carbon black, inorganic reinforcer, organic reinforcer, etc.; specific examples of the filler-reinforcer include inorganic reinforcer, organic reinforcer, plastic reinforcer, etc.; specific examples of the blowing agent-supplement blowing agent include inorganic blowing agent, nitroso compound, azo compound, sulfonyl-hydrazide, etc.; specific examples of the lubricant-slip additive-internal releasant-anti-fogging agent-frame retardant include paraffin and hydrocarbon resin, fatty acid, fatty amide, fatty ester, fatty alcohol, partial ester of fatty acid and polyhydric alcohol, etc.; specific examples of the antistatic agent for incorporation include cationic activator, quaternary ammonium salt, stearoamidepropyldimethyl-β-hydroxyethylammonium, etc.; specific examples of the colorant include inorganic pigment, organic pigment, organic fluorescent pigment, pearlescent pigment, etc.; and specific examples of the coupler include silane, aluminum and titanate couplers. An amount of these additives added is appropriately adjusted according to the usage and purpose, and is not specifically limited. These additives are normally blended by using a brabender, a Banbury mixer, a kneader, an open roll, etc. before the crosslinking reaction. After various additives were blended, the resultant is subjected to the crosslinking reaction.

Among the above steps, the crosslinking step will be described in detail. That is, the copolymer prepared by blending various additives is molded into the desired shape by using an extrusion molder, a calender roll or a press, and then the molded article is introduced into a vulcanization vessel, with or after molding, and heated at a temperature of 120 to 270° C. for 1 to 3 hours to obtain a crosslinked copolymer. In case of performing such the vulcanization, a mold may be used or not. When using no mold, the steps of molding and vulcanization are normally carried out, continuously.

As described above, the crosslinking copolymer composition of the present invention can accomplish the same crosslinking rate as that of a crosslinking composition composed of a conventional copolymer using an expensive diene monomer component. Furthermore, the crosslinked copolymer obtained by the crosslinking reaction superior in heat deterioration resistance to a crosslinked copolymer using an expensive diene monomer, and hardly causes heat curing.

One embodiment of a method of producing the ethylene-α-olefin-branched conjugated polyvalent olefin copolymer of the present invention will be described in detail hereinafter. The copolymer of the present invention is obtainable by copolymerizing ethylene, an α-olefin and a branched conjugated polyvalent olefin monomer in the presence of the catalyst suggested previously by the present applicant (Japanese Patent Application No. 185081/1996), i.e. a catalyst obtainable by using a transition metal complex represented by the above-mentioned general formula (1).

Transition Metal Complex

Compound (A)

In the general formula (1), the transition metal atom represented by $M^1$ is a transition metal element of the group IV in the Periodic Table of the Elements (Revised Version 1989 of IUPAC, Inorganic Chemistry Nomenclature) and examples thereof include titanium atom, zirconium atom, hafnium atom and the like. Titanium atom is preferable.

Examples of the atom of the group 16 in the Periodic Table of the element represented by "A" include oxygen atom, sulfur atom, selenium atom, etc., preferably oxygen atom.

Examples of the atom of the group XIV in the Periodic Table of the element represented by "B" include carbon atom, silicon atom, germanium atom and the like. Carbon atom and silicon atom are preferable.

Examples of the group having a cyclopentadiene type skeleton represented by the substituent $Cp^1$ include $\eta^5$-cyclopentadienyl group, $\eta^5$-methylcyclopentadienyl group, $\eta^5$-dimethylcyclopentadienyl group, $\eta^5$-trimethylcyclopentadienyl group, $\eta^5$-tetramethylcyclopentadienyl group, $\eta^5$-ethylcyclopentadienyl group, $\eta^5$-n-propylcyclopentadienyl group, $\eta^5$-isopropylcyclopentadienyl group, $\eta^5$-n-butylcyclopentadienyl group, $\eta^5$-sec-butylcyclopentadienyl group, $\eta^5$-tert-butylcyclopentadienyl group, $\eta^5$-n-pentylcyclopentadienyl group, $\eta^5$-neopentylcyclopentadienyl group, $\eta^5$-n-hexylcyclopentadienyl group, $\eta^5$-n-octylcyclopentadienyl group, $\eta^5$-phenylcyclopentadienyl group, $\eta^5$-naphthylcyclopentadienyl group, $\eta^5$-trimethylsilylcyclopentadienyl group, $\eta^5$-triethylsilylcyclopentadienyl group, $\eta^5$-tert-butyldimethylsilylcyclopentadienyl group, $\eta^5$-indenyl group, $\eta^5$-methylindenyl group, $\eta^5$-dimethylindenyl group, $\eta^5$-ethylindenyl group, $\eta^5$-n-propylindenyl group, $\eta^5$-isopropylindenyl group, $\eta^5$-n-butylindenyl group, $\eta^5$-sec-butylindenyl group, $\eta^5$-tert-butylindenyl group, $\eta^5$-n-pentylindenyl group, $\eta^5$-neopentylindenyl group, $\eta^5$-n-hexylindenyl group, $\eta^5$-n-octylindenyl group, $\eta^5$-n-decylindenyl group, $\eta^5$-phenylindenyl group, $\eta^5$-methylphenylindenyl group, $\eta^5$-naphthylindenyl group, $\eta^5$-trimethylsilylindenyl group, $\eta^5$-triethylsilylindenyl group, $\eta^5$-tert-butyldimethylsilylindenyl group, $\eta^5$-tetrahydroindenyl group, $\eta^5$-fluorenyl group, $\eta^5$-methylfluorenyl group, $\eta^5$-dimethylfluorenyl group, $\eta^5$-ethylfluorenyl group, $\eta^5$-diethylfluorenyl group, $\eta^5$-n-propylfluorenyl group, $\eta^5$-di-n-propylfluorenyl group, $\eta^5$-isopropylfluorenyl group, $\eta^5$-diisopropylfluorenyl group, $\eta^5$-n-butylfluorenyl group, $\eta^5$-sec-butylfluorenyl group, $\eta^5$-tert-butylfluorenyl group, $\eta^5$-di-n-butylfluorenyl group, $\eta^5$-di-sec-butylfluorenyl group, $\eta^5$-di-tert-butylfluorenyl group, $\eta^5$-n-pentylfluorenyl group, $\eta^5$-neopentylfluorenyl group, $\eta^5$-n-hexylfluorenyl group, $\eta^5$-n-octylfluorenyl group, $\eta^5$-n-decylfluorenyl group, $\eta^5$-n-dodecylfluorenyl group, $\eta^5$-phenylfluorenyl group, $\eta^5$-di-phenylfluorenyl group, $\eta^5$-methylphenylfluorenyl group, $\eta^5$-naphthylfluorenyl group, $\eta^5$-trimethylsilylfluorenyl group, $\eta^5$-bis-trimethylsilylfluorenyl group, $\eta^5$-triethylsilylfluorenyl group, $\eta^5$-tert-butyldimethylsilylfluorenyl group, etc., preferably $\eta^5$-cyclopentadienyl group, $\eta^5$-methylcyclopentadienyl group, $\eta^5$-tert-butylcyclopentadienyl group, $\eta^5$-tetramethylcyclopentadienyl group, $\eta^5$-indenyl group and $\eta^5$-fluorenyl group.

Examples of the halogen atom in the substituents $X^1$, $X^2$, $R^1$, $R^2$, $R^3$, $R^4$, $R^5$ and $R^6$ include fluorine atom, chlorine atom, bromine atom, iodine atom and the like.

Examples of alkyl group having carbon atoms of 1–20 in the substituents $X^1$, $X^2$, $R^1$, $R^2$, $R^3$, $R^4$, $R^5$ and $R^6$ include methyl group, ethyl group, n-propyl group, isopropyl group, n-butyl group, sec-butyl group, tert-butyl group, n-pentyl group, neopentyl group, amyl group, n-hexyl group, n-octyl group, n-decyl group, n-dodecyl group, n-pentadecyl group, n-eicosyl group, etc., preferably methyl group, ethyl group, isopropyl group, tert-butyl group and amyl group.

All of these alkyl groups may be substituted with the halogen atom such as fluorine atom, chlorine atom, bromine atom, iodine atom and the like. Examples of the alkyl group having carbon atoms of 1–20 substituted with the halogen atom include fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, perbromoeicosyl group and the like.

Examples of the aralkyl group having carbon atoms of 7–20 in the substituents $X^1$, $X^2$, $R^1$, $R^2$, $R^3$, $R^4$, $R^5$ and $R^6$ include benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (4,6-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-dodecylphenyl)methyl group, (n-decylphenyl)methyl group, (n-tetradecylphenyl)methyl group, naphthylmethyl group, anthracenylmethyl group, etc., preferably benzyl group. All of these aralkyl groups may be substituted with the halogen atom such as fluorine atom, chlorine atom, bromine atom, iodine atom and the like.

Examples of the aryl group having carbon atoms of 6–20 in the substituents $X^1$, $X^2$, $R^1$, $R^2$, $R^3$, $R^4$, $R^5$ and $R^6$ include phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group, etc., preferably phenyl group. All of these aryl groups may be substituted with the halogen atom such as fluorine atom, chlorine atom, bromine atom, iodine atom and the like.

The substituted silyl group in the substituents $X^1$, $X^2$, $R^1$, $R^2$, $R^3$, $R^4$, $R^5$ and $R^6$ is a silyl group substituted with a hydrocarbon group, and examples of the hydrocarbon group include alkyl group having carbon atoms of 1–20 such as methyl group, ethyl group, n-propyl group, isopropyl group, n-butyl group, sec-butyl group, tert-butyl group, isobutyl group, n-pentyl group, n-hexyl group, cyclohexyl group, etc.; and aryl group such as phenyl group, etc. Examples of the substituted silyl group include monosubstituted silyl group having carbon atoms of 1–20 such as methylsilyl group, ethylsilyl group, phenylsilyl group, etc.; disubstituted silyl group having carbon atoms of 2–20 such as dimethylsilyl group, diethylsilyl group, diphenylsilyl group, etc.; and trisubstituted silyl group having carbon atoms of 3–20 such as trimethylsilyl group, triethylsilyl group, tri-n-propylsilyl group, triisopropylsilyl group, tri-n-butylsilyl group, tri-sec-butylsilyl group, tri-tert-butylsilyl group, tri-isobutylsilyl group, tert-butyl-dimethylsilyl group, tri-n-pentylsilyl group, tri-n-hexylsilyl group, tricyclohexylsilyl group, triphenylsilyl group, etc., preferably trimethylsilyl group, tert-butyldimethylsilyl group and triphenylsilyl group. Regarding all of these substituted silyl groups, the hydrocarbon group may be substituted with the halogen atom such as fluorine atom, chlorine atom, bromine atom, iodine atom and the like.

Examples of the alkoxy group having carbon atoms of 1–20 in the substituents $X^1$, $X^2$, $R^1$, $R^2$, $R^3$, $R^4$, $R^5$ and $R^6$ include methoxy group, ethoxy group, n-propoxy group, isopropoxy group, n-butoxy group, sec-butoxy group, t-butoxy group, n-pentoxy group, neopentoxy group, n-hexoxy group, n-octoxy group, n-dodecoxy group, n-pentadecoxy group, n-icosoxy group, etc., preferably methoxy group, ethoxy group and t-butoxy group. All of these alkoxy groups may be substituted with the halogen atom such as fluorine atom, chlorine atom, bromine atom, iodine atom and the like.

Examples of the aralkyloxy group having carbon atoms of 7–20 in the substituents $X^1$, $X^2$, $R^1$, $R^2$, $R^3$, $R^4$, $R^5$ and $R^6$ include benzyloxy group, (2-methylphenyl)methoxy group, (3-methylphenyl)methoxy group, (4-methylphenyl)methoxy group, (2,3-dimethylphenyl)methoxy group, (2,4-dimethylphenyl)methoxy group, (2,5-dimethylphenyl) methoxy group, (2,6-dimethylphenyl)methoxy group, (3,4-dimethylphenyl)methoxy group, (3,5-dimethylphenyl) methoxy group, (2,3,4-trimethylphenyl)methoxy group, (2,3,5-trimethylphenyl)methoxy group, (2,3,6-trimethylphenyl)methoxy group, (2,4,5-trimethylphenyl) methoxy group, (2,4,6-trimethylphenyl)methoxy group, (3,4,5-trimethylphenyl)methoxy group, (2,3,4,5-tetramethylphenyl)methoxy group, (2,3,4,6-tetramethylphenyl)methoxy group, (2,3,5,6-tetramethylphenyl)methoxy group, (pentamethylphenyl) methoxy group, (ethylphenyl)methoxy group, (n-propylphenyl)methoxy group, (isopropylphenyl)methoxy group, (n-butylphenyl)methoxy group, (sec-butylphenyl) methoxy group, (tert-butylphenyl)methoxy group, (n-hexylphenyl)methoxy group, (n-octylphenyl)methoxy group, (n-decylphenyl)methoxy group, (n-decylphenyl) methoxy group, (n-tetradecylphenyl)methoxy group, naphthylmethoxy group, anthracenylmethoxy group, etc., preferably benzyloxy group. All of these aralkyloxy groups may be substituted with the halogen atom such as fluorine atom, chlorine atom, bromine atom, iodine atom and the like.

Examples of the aryloxy group in the substituents $X^1$, $X^2$, $R^1$, $R^2$, $R^3$, $R^4$, $R^5$ and $R^6$ include aryloxy group having carbon atoms of 6–20 such as phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,6-trimethylphenoxy group, 2,4,5-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenoxy group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-dodecylphenoxy group, n-tetradecylphenoxy group, naphthoxy group, anthracenoxy group and the like.

All of these aryloxy groups may be substituted with the halogen atom such as fluorine atom, chlorine atom, bromine atom, iodine atom and the like.

The disubstituted amino group in the substituents $X^1$, $X^2$, $R^1$, $R^2$, $R^3$, $R^4$, $R^5$ and $R^6$ is an amino group substituted with two hydrocarbon groups, and examples of the hydrocarbon group include alkyl group having carbon atoms of 1–10 such as methyl group, ethyl group, n-propyl group, isopropyl group, n-butyl group, sec-butyl group, tert-butyl group, isobutyl group, n-pentyl group, n-hexyl group, cyclohexyl group, etc.; and aryl group such as phenyl group, etc. Examples of the $C_{1-10}$ disubstituted amino group include dimethylamino group, diethylamino group, di-n-propylamino group, diisopropylamino group, di-n-butylamino group, di-sec-butylamino group, di-tert-butylamino group, diisobutylamino group, tert-butylisopropylamino group, di-n-hexylamino group, di-n-octylamino group, di-n-decylamino group, diphenylamino group, bistrimethylsilylamino group, bis-tert-butyldimethylsilylamino group, etc., preferably dimethylamino group and diethylamino group.

The substituents $X^1$, $X^2$, $R^1$, $R^2$, $R^3$, $R^4$, $R^5$ and $R^6$ may be combined optionally to form a ring.

Preferably, $R^1$ is a alkyl group having carbon atoms of 1–20 which may be substituted with a halogen atom, a aralkyl group having carbon atoms of 7–20 which may be substituted with a halogen atom, a aryl group having carbon atoms of 6–20 which may be substituted with a halogen atom, or a substituted silyl group having carbon atoms of 1–20 which may be substituted with a halogen atom.

Preferably, $X^1$ and $X^2$ independently represent a halogen atom, a alkyl group having carbon atoms of 1–20 which may be substituted with a halogen atom, a aralkyl group having carbon atoms of 7–20 which may be substituted with a halogen atom, or a aryl group having carbon atoms of 6–20 which may be substituted with a halogen atom, more preferably halogen atom.

Specific examples of the transition metal complex include methylene(cyclopentadienyl)(3,5-dimethyl-2-phenoxy) titanium dichloride, methylene(cyclopentadienyl)(3-tert-butyl-2-phenoxy)titanium dichloride, methylene (cyclopentadienyl)(3-tert-butyl-5-methyl-2-phenoxy) titanium dichloride, methylene(cyclopentadienyl)(3-phenyl-2-phenoxy)titanium dichloride, methylene (cyclopentadienyl)(3-tert-butyldimethylsilyl-5-methyl-2-phenoxy)titanium dichloride, methylene(cyclopentadienyl) (3-trimethylsilyl-5-methyl-2-phenoxy)titanium dichloride, methylene(cyclopentadienyl)(3-tert-butyl-5-methoxy-2-phenoxy)titanium dichloride, methylene(cyclopentadienyl) (3-tert-butyl-5-chloro-2-phenoxy)titanium dichloride, methylene(methylcyclopentadienyl)(3,5-dimethyl-2-phenoxy)titanium dichloride, methylene (methylcyclopentadienyl)(3-tert-butyl-2-phenoxy)titanium dichloride, methylene(methylcyclopentadienyl)(3-tert-butyl-5-methyl-2-phenoxy)titanium dichloride, methylene (methylcyclopentadienyl)(3-phenyl-2-phenoxy)titanium dichloride, methylene(methylcyclopentadienyl)(3-tert-butyldimethylsilyl-5-methyl-2-phenoxy)titanium dichloride, methylene(methylcyclopentadienyl)(3-trimethylsilyl-5-methyl-2-phenoxy)titanium dichloride, methylene(methylcyclopentadienyl)(3-tert-butyl-5-methoxy-2-phenoxy)titanium dichloride, methylene (methylcyclopentadienyl)(3-tert-butyl-5-chloro-2-phenoxy) titanium dichloride, methylene(tert-butylcyclopentadienyl)( 3,5-dimethyl-2-phenoxy)titanium dichloride, methylene (tert-butylcyclopentadienyl)(3-tert-butyl-2-phenoxy) titanium dichloride, methylene(tert-butylcyclopentadienyl) (3-tert-butyl-5-methyl-2-phenoxy)titanium dichloride, methylene(tert-butylcyclopentadienyl)(3-phenyl-2-phenoxy)titanium dichloride, methylene(tert-butylcyclopentadienyl)(3-tert-butyldimethylsilyl-5-methyl-2-phenoxy)titanium dichloride, methylene(tert-butylcyclopentadienyl)(3-trimethylsilyl-5-methyl-2-phenoxy)titanium dichloride, methylene(tert-butylcyclopentadienyl)(3-tert-butyl-5-methoxy-2-phenoxy) titanium dichloride, methylene(tert-butylcyclopentadienyl) (3-tert-butyl-5-chloro-2-phenoxy)titanium dichloride, methylene(tetramethylcyclopentadienyl)(3,5-dimethyl-2-phenoxy)titanium dichloride, methylene (tetramethylcyclopentadienyl)(3-tert-butyl-2-phenoxy) titanium dichloride, methylene (tetramethylcyclopentadienyl)(3-tert-butyl-5-methyl-2-phenoxy)titanium dichloride, methylene (tetramethylcyclopentadienyl)(3-phenyl-2-phenoxy) titanium dichloride, methylene (tetramethylcyclopentadienyl)(3-tert-butyldimethylsilyl-5-methyl-2-phenoxy)titanium dichloride, methylene (tetramethylcyclopentadienyl)(3-trimethylsilyl-5-methyl-2-phenoxy)titanium dichloride, methylene (tetramethylcyclopentadienyl)(3-tert-butyl-5-methoxy-2-phenoxy)titanium dichloride, methylene (tetramethylcyclopentadienyl)(3-tert-butyl-5-chloro-2-phenoxy)titanium dichloride, methylene (trimethylsilylcyclopentadienyl)(3,5-dimethyl-2-phenoxy) titanium dichloride, methylene (trimethylsilylcyclopentadienyl)(3-tert-butyl-2-phenoxy) titanium dichloride, methylene (trimethylsilylcyclopentadienyl)(3-tert-butyl-5-methyl-2-phenoxy)titanium dichloride, methylene (trimethylsilylcyclopentadienyl)(3-phenyl-2-phenoxy) titanium dichloride, methylene (trimethylsilylcyclopentadienyl)(3-tert-butyldimethylsilyl-5-methyl-2-phenoxy)titanium dichloride, methylene (trimethylsilylcyclopentadienyl)(3-trimethylsilyl-5-methyl-2-phenoxy)titanium dichloride, methylene (trimethylsilylcyclopentadienyl)(3-tert-butyl-5-methoxy-2-phenoxy)titanium dichloride, methylene (trimethylsilylcyclopentadienyl)(3-tert-butyl-5-chloro-2-phenoxy)titanium dichloride, methylene(fluorenyl)(3-tert-butyl-2-phenoxy)titanium dichloride, methylene(fluorenyl) (3-tert-butyl-5-methyl- 2-phenoxy)titanium dichloride, methylene(fluorenyl)(3-phenyl-2-phenoxy)titanium dichloride, methylene(fluorenyl)(3-tert-butyldimethylsilyl-5-methyl-2-phenoxy)titanium dichloride, methylene (fluorenyl)(3-trimethylsilyl-5-methyl-2-phenoxy)titanium dichloride, methylene(fluorenyl)(3-tert-butyl-5-methoxy-2-phenoxy)titanium dichloride, methylene(fluorenyl)(3-tert-butyl-5-chloro-2-phenoxy)titanium dichloride, isopropylidene(cyclopentadienyl)(3,5-dimethyl-2-phenoxy) titanium dichloride, isopropylidene(cyclopentadienyl)(3-tert-butyl-2-phenoxy)titanium dichloride, isopropylidene (cyclopentadienyl)(3-tert-butyl-5-methyl-2-phenoxy) titanium dichloride, isopropylidene(cyclopentadienyl)(3-phenyl-2-phenoxy)titanium dichloride, isopropylidene (cyclopentadienyl)(3-tert-butyldimethylsilyl-5-methyl-2-phenoxy)titanium dichloride, isopropylidene (cyclopentadienyl)(3-trimethylsilyl-5-methyl-2-phenoxy) titanium dichloride, isopropylidene(cyclopentadienyl)(3-tert-butyl-5-methoxy-2-phenoxy)titanium dichloride, isopropylidene(cyclopentadienyl)(3-tert-butyl-5-chloro-2-phenoxy)titanium dichloride, isopropylidene (methylcyclopentadienyl)(3,5-dimethyl-2-phenoxy) titanium dichloride, isopropylidene (methylcyclopentadienyl)(3-tert-butyl-2-phenoxy)titanium dichloride, isopropylidene(methylcyclopentadienyl)(3-tert-butyl-5-methyl-2-phenoxy)titanium dichloride, isopropylidene(methylcyclopentadienyl)(3-phenyl-2-phenoxy)titanium dichloride, isopropylidene (methylcyclopentadienyl)(3-tert-butyldimethylsilyl-5-methyl-2-phenoxy)titanium dichloride, isopropylidene (methylcyclopentadienyl)(3-trimethylsilyl-5-methyl-2-phenoxy)titanium dichloride, isopropylidene (methylcyclopentadienyl)(3-tert-butyl-5-methoxy-2-phenoxy)titanium dichloride, isopropylidene (methylcyclopentadienyl)(3-tert-butyl-5-chloro-2-phenoxy) titanium dichloride, isopropylidene(tert-butylcyclopentadienyl)(3,5-dimethyl-2-phenoxy)titanium dichloride, isopropylidene(tert-butylcyclopentadienyl)(3-tert-butyl-2-phenoxy)titanium dichloride, isopropylidene (tert-butylcyclopentadienyl)(3-tert-butyl-5-methyl-2-phenoxy)titanium dichloride, isopropylidene(tert-butylcyclopentadienyl)(3-phenyl-2-phenoxy)titanium dichloride, isopropylidene(tert-butylcyclopentadienyl)( 3-tert-butyldimethylsilyl-5-methyl-2-phenoxy)titanium dichloride, isopropylidene(tert-butylcyclopentadienyl)(3-trimethylsilyl-5-methyl-2-phenoxy)titanium dichloride, isopropylidene(tert-butylcyclopentadienyl)(3-tert-butyl-5-methoxy-2-phenoxy)titanium dichloride, isopropylidene (tert-butylcyclopentadienyl)(3-tert-butyl-5-chloro-2-phenoxy)titanium dichloride, isopropylidene (tetramethylcyclopentadienyl)(3,5-dimethyl-2-phenoxy) titanium dichloride, isopropylidene (tetramethylcyclopentadienyl)(3-tert-butyl-2-phenoxy) titanium dichloride, isopropylidene (tetramethylcyclopentadienyl)(3-tert-butyl-5-methyl-2-phenoxy)titanium dichloride, isopropylidene (tetramethylcyclopentadienyl)(3-phenyl-2-phenoxy) titanium dichloride, isopropylidene (tetramethylcyclopentadienyl)(3-tert-butyldimethylsilyl-5-methyl-2-phenoxy)titanium dichloride, isopropylidene(tetramethylcyclopentadienyl)(3-trimethylsilyl-5-methyl-2-phenoxy)titanium dichloride, isopropylidene(tetramethylcyclopentadienyl)(3-tert-butyl-5-methoxy-2-phenoxy)titanium dichloride, isopropylidene(tetramethylcyclopentadienyl)(3-tert-butyl-5-chloro-2-phenoxy)titanium dichloride, isopropylidene(trimethylsilylcyclopentadienyl)(3,5-dimethyl-2-phenoxy)titanium dichloride, isopropylidene(trimethylsilylcyclopentadienyl)(3-tert-butyl-2-phenoxy)titanium dichloride, isopropylidene(trimethylsilylcyclopentadienyl)(3-tert-butyl-5-methyl-2-phenoxy)titanium dichloride, isopropylidene(trimethylsilylcyclopentadienyl)(3-phenyl-2-phenoxy)titanium dichloride, isopropylidene(trimethylsilylcyclopentadienyl)(3-tert-butyldimethylsilyl-5-methyl-2-phenoxy)titanium dichloride, isopropylidene(trimethylsilylcyclopentadienyl)(3-trimethylsilyl-5-methyl-2-phenoxy)titanium dichloride, isopropylidene(trimethylsilylcyclopentadienyl)(3-tert-butyl-5-methoxy-2-phenoxy)titanium dichloride, isopropylidene(trimethylsilylcyclopentadienyl)(3-tert-butyl-5-chloro-2-phenoxy)titanium dichloride, isopropylidene(fluorenyl)(3,5-dimethyl-2-phenoxy)titanium dichloride, isopropylidene(fluorenyl)(3-tert-butyl-2-phenoxy)titanium dichloride, isopropylidene(fluorenyl)(3-tert-butyl-5-methyl-2-phenoxy)titanium dichloride, isopropylidene(fluorenyl)(3-phenyl-2-phenoxy)titanium dichloride, isopropylidene(fluorenyl)(3-tert-butyldimethylsilyl- 5-methyl-2-phenoxy)titanium dichloride, isopropylidene(fluorenyl)(3-trimethylsilyl-5-methyl-2-phenoxy)titanium dichloride, isopropylidene(fluorenyl)(3-tert-butyl-5-methoxy-2-phenoxy)titanium dichloride, isopropylidene(fluorenyl)(3-tert-butyl-5-chloro-2-phenoxy)titanium dichloride, diphenylmethylene(cyclopentadienyl)(3,5-dimethyl-2-phenoxy)titanium dichloride, diphenylmethylene(cyclopentadienyl)(3-tert-butyl-2-phenoxy)titanium dichloride, diphenylmethylene(cyclopentadienyl)(3-tert-butyl-5-methyl-2-phenoxy)titanium dichloride, diphenylmethylene(cyclopentadienyl)(3-phenyl-2-phenoxy)titanium dichloride, diphenylmethylene(cyclopentadienyl)(3-tert-butyldimethylsilyl-5-methyl-2-phenoxy)titanium dichloride, diphenylmethylene(cyclopentadienyl)(3-trimethylsilyl-5-methyl-2-phenoxy)titanium dichloride, diphenylmethylene(cyclopentadienyl)(3-tert-butyl-5-methoxy-2-phenoxy)titanium dichloride, diphenylmethylene(cyclopentadienyl)(3-tert-butyl-5-chloro-2-phenoxy)titanium dichloride, diphenylmethylene(methylcyclopentadienyl)(3,5-dimethyl-2-phenoxy)titanium dichloride, diphenylmethylene(methylcyclopentadienyl)( 3-tert-butyl-2-phenoxy)titanium dichloride, diphenylmethylene(methylcyclopentadienyl)(3-tert-butyl-5-methyl-2-phenoxy)titanium dichloride, diphenylmethylene(methylcyclopentadienyl)(3-phenyl-2-phenoxy)titanium dichloride, diphenylmethylene(methylcyclopentadienyl)(3-tert-butyldimethylsilyl-5-methyl-2-phenoxy)titanium dichloride, diphenylmethylene(methylcyclopentadienyl)(3-trimethylsilyl-5-methyl-2-phenoxy)titanium dichloride, diphenylmethylene(methylcyclopentadienyl)(3-tert-butyl-5-methoxy-2-phenoxy)titanium dichloride, diphenylmethylene(methylcyclopentadienyl)(3-tert-butyl-5-chloro-2-phenoxy)titanium dichloride, diphenylmethylene(tert-butylcyclopentadienyl)(3,5-dimethyl-2-phenoxy)titanium dichloride, diphenylmethylene(tert-butylcyclopentadienyl)(3-tert-butyl-2-phenoxy)titanium dichloride, diphenylmethylene(tert-butylcyclopentadienyl)(3-tert-butyl-5-methyl-2-phenoxy)titanium dichloride, diphenylmethylene(tert-butylcyclopentadienyl)(3-phenyl-2-phenoxy)titanium dichloride, diphenylmethylene(tert-butylcyclopentadienyl)(3-tert-butyldimethylsilyl-5-methyl-2-phenoxy)titanium dichloride, diphenylmethylene(tert-butylcyclopentadienyl)(3-trimethylsilyl-5-methyl-2-phenoxy)titanium dichloride, diphenylmethylene(tert-butylcyclopentadienyl)(3-tert-butyl-5-methoxy-2-phenoxy)titanium dichloride, diphenylmethylene(tert-butylcyclopentadienyl)(3-tert-butyl-5-chloro-2-phenoxy)titanium dichloride, diphenylmethylene(tetramethylcyclopentadienyl)(3,5-dimethyl-2-phenoxy)titanium dichloride, diphenylmethylene(tetramethylcyclopentadienyl)(3-tert-butyl-2-phenoxy)titanium dichloride, diphenylmethylene(tetramethylcyclopentadienyl)(3-tert-butyl-5-methyl-2-phenoxy)titanium dichloride, diphenylmethylene(tetramethylcyclopentadienyl)(3-phenyl-2-phenoxy)titanium dichloride, diphenylmethylene(tetramethylcyclopentadienyl)(3-tert-butyldimethylsilyl-5-methyl-2-phenoxy)titanium dichloride, diphenylmethylene(tetramethylcyclopentadienyl)(3-trimethylsilyl-5-methyl-2-phenoxy)titanium dichloride, diphenylmethylene(tetramethylcyclopentadienyl)(3-tert-butyl-5-methoxy-2-phenoxy)titanium dichloride, diphenylmethylene(tetramethylcyclopentadienyl)(3-tert-butyl-5-chloro-2-phenoxy)titanium dichloride, diphenylmethylene(trimethylsilylcyclopentadienyl)(3,5-dimethyl-2-phenoxy)titanium dichloride, diphenylmethylene(trimethylsilylcyclopentadienyl)(3-tert-butyl-2-phenoxy)titanium dichloride, diphenylmethylene(trimethylsilylcyclopentadienyl)(3-tert-butyl-5-methyl-2-phenoxy)titanium dichloride, diphenylmethylene(trimethylsilylcyclopentadienyl)(3-phenyl-2-phenoxy)titanium dichloride, diphenylmethylene(trimethylsilylcyclopentadienyl)(3-tert-butyldimethylsilyl-5-methyl-2-phenoxy)titanium dichloride, diphenylmethylene(trimethylsilylcyclopentadienyl)(3-trimethylsilyl-5-methyl-2-phenoxy)titanium dichloride, diphenylmethylene(trimethylsilylcyclopentadienyl)(3-tert-butyl-5-methoxy-2-phenoxy)titanium dichloride, diphenylmethylene(trimethylsilylcyclopentadienyl)(3-tert-butyl-5-chloro-2-phenoxy)titanium dichloride, diphenylmethylene(fluorenyl)(3,5-dimethyl-2-phenoxy)titanium dichloride, diphenylmethylene(fluorenyl)(3-tert-butyl-2-phenoxy)titanium dichloride, diphenylmethylene(fluorenyl)(3-tert-butyl-5-methyl-2-phenoxy)titanium dichloride, diphenylmethylene(fluorenyl)(3-phenyl-2-phenoxy)titanium dichloride, diphenylmethylene(fluorenyl)(3-tert-butyldimethylsilyl-5-methyl-2-phenoxy)titanium dichloride, diphenylmethylene(fluorenyl)(3-trimethylsilyl-5-methyl-2-phenoxy)titanium dichloride, diphenylmethylene(fluorenyl)(3-tert-butyl-5-methoxy-2-phenoxy)titanium dichloride, diphenylmethylene(fluorenyl)(3-tert-butyl-5-chloro-2-phenoxy)titanium dichloride, etc., transition metal complexes wherein B in the chemical formula [I] is a carbon atom, such as compounds wherein titanium of these compounds is replaced by zirconium and hafnium, compounds wherein chloride of these compounds is replaced by bromide, iodide, dimethylamide, diethylamide, n-butoxide and isopropoxide, compounds wherein cyclopentadienyl of these compounds is replaced by dimethylcyclopentadienyl, trimethylcyclopentadienyl, n-butylcyclopentadienyl, tert-butyldimethylsilylcyclopentadienyl and indenyl, and compounds wherein 3,5-dimethyl-2-phenoxy of these compounds is replaced by 2-phenoxy, 3-methyl-2-phenoxy, 3,5-di-tert-butyl-2-phenoxy, 3-phenyl-5-methyl-2-phenoxy, 3-tert-butyldimethylsilyl-2-phenoxy and 3-trimethylsilyl-2-phenoxy; and dimethylsilyl(cyclopentadienyl)(2-phenoxy) titanium dichloride, dimethylsilyl(cyclopentadienyl)(3-methyl-2-phenoxy)titanium dichloride, dimethylsilyl (cyclopentadienyl)(3,5-dimethyl-2-phenoxy)titanium dichloride, dimethylsilyl(cyclopentadienyl)(3-tert-butyl-2-phenoxy)titanium dichloride, dimethylsilyl (cyclopentadienyl)(3-tert-butyl-5-methyl-2-phenoxy) titanium dichloride, dimethylsilyl(cyclopentadienyl)(3,5-di-tert-butyl-2-phenoxy)titanium dichloride, dimethylsilyl (cyclopentadienyl)(5-methyl-3-phenyl-2-phenoxy)titanium dichloride, dimethylsilyl(cyclopentadienyl)(3-tert-butyldimethylsilyl-5-methyl-2-phenoxy)titanium dichloride, dimethylsilyl(cyclopentadienyl)(5-methyl-3-trimethylsilyl-2-phenoxy)titanium dichloride, dimethylsilyl (cyclopentadienyl)(3-tert-butyl-5-methoxy-2-phenoxy) titanium dichloride, dimethylsilyl(cyclopentadienyl)(3-tert-butyl-5-chloro-2-phenoxy)titanium dichloride, dimethylsilyl(cyclopentadienyl)(3,5-diamyl-2-phenoxy) titanium dichloride, dimethylsilyl(methylcyclopentadienyl) (2-phenoxy)titanium dichloride, dimethylsilyl (methylcyclopentadienyl)(3-methyl-2-phenoxy)titanium dichloride, dimethylsilyl(methylcyclopentadienyl)(3,5-dimethyl-2-phenoxy)titanium dichloride, dimethylsilyl (methylcyclopentadienyl)(3-tert-butyl-2-phenoxy)titanium dichloride, dimethylsilyl(methylcyclopentadienyl)(3-tert-butyl-5-methyl-2-phenoxy)titanium dichloride, dimethylsilyl(methylcyclopentadienyl)(3,5-di-tert-butyl-2-phenoxy)titanium dichloride, dimethylsilyl (methylcyclopentadienyl)(5-methyl-3-phenyl-2-phenoxy) titanium dichloride, dimethylsilyl(methylcyclopentadienyl) (3-tert-butyldimethylsilyl-5-methyl-2-phenoxy)titanium dichloride, dimethylsilyl(methylcyclopentadienyl)(5-methyl-3-trimethylsilyl-2-phenoxy)titanium dichloride, dimethylsilyl(methylcyclopentadienyl)(3-tert-butyl-5-methoxy-2-phenoxy)titanium dichloride, dimethylsilyl (methylcyclopentadienyl)(3-tert-butyl-5-chloro-2-phenoxy) titanium dichloride, dimethylsilyl(methylcyclopentadienyl) (3,5-diamyl-2-phenoxy)titanium dichloride, dimethylsilyl (n-butylcyclopentadienyl)(2-phenoxy)titanium dichloride, dimethylsilyl(n-butylcyclopentadienyl)(3-methyl-2-phenoxy)titanium dichloride, dimethylsilyl(n-butylcyclopentadienyl)(3,5-dimethyl-2-phenoxy)titanium dichloride, dimethylsilyl(n-butylcyclopentadienyl)(3-tert-butyl-2-phenoxy)titanium dichloride, dimethylsilyl(n-butylcyclopentadienyl)(3-tert-butyl-5-methyl-2-phenoxy) titanium dichloride, dimethylsilyl(n-butylcyclopentadienyl) (3,5-di-tert-butyl-2-phenoxy)titanium dichloride, dimethylsilyl(n-butylcyclopentadienyl)( 5-methyl-3-phenyl-2-phenoxy)titanium dichloride, dimethylsilyl(n-butylcyclopentadienyl)(3-tert-butyldimethylsilyl-5-methyl-2-phenoxy)titanium dichloride, dimethylsilyl(n-butylcyclopentadienyl)(5-methyl-3-trimethylsilyl-2-phenoxy)titanium dichloride, dimethylsilyl(n-butylcyclopentadienyl)(3-tert-butyl-5-methoxy-2-phenoxy) titanium dichloride, dimethylsilyl(n-butylcyclopentadienyl) (3-tert-butyl-5-chloro-2-phenoxy)titanium dichloride, dimethylsilyl(n-butylcyclopentadienyl)(3,5-diamyl-2-phenoxy)titanium dichloride, dimethylsilyl(tert-butylcyclopentadienyl)(2-phenoxy)titanium dichloride, dimethylsilyl(tert-butylcyclopentadienyl)(3-methyl-2-phenoxy)titanium dichloride, dimethylsilyl(tert-butylcyclopentadienyl)(3,5-dimethyl-2-phenoxy)titanium dichloride, dimethylsilyl(tert-butylcyclopentadienyl)(3-tert-butyl-2-phenoxy)titanium dichloride, dimethylsilyl(tert-butylcyclopentadienyl)(3-tert-butyl-5-methyl-2-phenoxy) titanium dichloride, dimethylsilyl(tert-butylcyclopentadienyl)(3,5-di-tert-butyl-2-phenoxy) titanium dichloride, dimethylsilyl(tert-butylcyclopentadienyl)(5-methyl-3-phenyl-2-phenoxy) titanium dichloride, dimethylsilyl(tert-butylcyclopentadienyl)( 3-tert-butyldimethylsilyl-5-methyl-2-phenoxy)titanium dichloride, dimethylsilyl(tert-butylcyclopentadienyl)(5-methyl-3-trimethylsilyl-2-phenoxy)titanium dichloride, dimethylsilyl(tert-butylcyclopentadienyl)(3-tert-butyl-5-methoxy-2-phenoxy) titanium dichloride, dimethylsilyl(tert-butylcyclopentadienyl)(3-tert-butyl-5-chloro-2-phenoxy) titanium dichloride, dimethylsilyl(tert-butylcyclopentadienyl)(3,5-diamyl-2-phenoxy)titanium dichloride, dimethylsilyl(tetramethylcyclopentadienyl)(2-phenoxy)titanium dichloride, dimethylsilyl (tetramethylcyclopentadienyl)(3-methyl-2-phenoxy) titanium dichloride, dimethylsilyl (tetramethylcyclopentadienyl)(3,5-dimethyl-2-phenoxy) titanium dichloride, dimethylsilyl (tetramethylcyclopentadienyl)(3-tert-butyl-2-phenoxy) titanium dichloride, dimethylsilyl (tetramethylcyclopentadienyl)(3-tert-butyl-5-methyl-2-phenoxy)titanium dichloride, dimethylsilyl (tetramethylcyclopentadienyl)(3,5-di-tert-butyl-2-phenoxy) titanium dichloride, dimethylsilyl (tetramethylcyclopentadienyl)(5-methyl-3-phenyl-2-phenoxy)titanium dichloride, dimethylsilyl (tetramethylcyclopentadienyl)(3-tert-butyldimethylsilyl-5-methyl-2-phenoxy)titanium dichloride, dimethylsilyl (tetramethylcyclopentadienyl)(5-methyl-3-trimethylsilyl-2-phenoxy)titanium dichloride, dimethylsilyl (tetramethylcyclopentadienyl)(3-tert-butyl-5-methoxy-2-phenoxy)titanium dichloride, dimethylsilyl (tetramethylcyclopentadienyl)(3-tert-butyl-5-chloro-2-phenoxy)titanium dichloride, dimethylsilyl (tetramethylcyclopentadienyl)(3,5-diamyl-2-phenoxy) titanium dichloride, dimethylsilyl (trimethylsilylcyclopentadienyl)(2-phenoxy)titanium dichloride, dimethylsilyl(trimethylsilylcyclopentadienyl)(3-methyl-2-phenoxy)titanium dichloride, dimethylsilyl (trimethylsilylcyclopentadienyl)(3,5-dimethyl-2-phenoxy) titanium dichloride, dimethylsilyl (trimethylsilylcyclopentadienyl)(3-tert-butyl-2-phenoxy) titanium dichloride, dimethylsilyl (trimethylsilylcyclopentadienyl)(3-tert-butyl-5-methyl-2-phenoxy)titanium dichloride, dimethylsilyl (trimethylsilylcyclopentadienyl)(3,5-di-tert-butyl-2-phenoxy)titanium dichloride, dimethylsilyl (trimethylcyclopentadienyl)(5-methyl-3-phenyl-2-phenoxy) titanium dichloride, dimethylsilyl (trimethylsilylcyclopentadienyl)(3-tert-butyldimethylsilyl-5-methyl-2-phenoxy)titanium dichloride, dimethylsilyl (trimethylsilylcyclopentadienyl)(5-methyl-3-trimethylsilyl-2-phenoxy)titanium dichloride, dimethylsilyl (trimethylsilylcyclopentadienyl)(3-tert-butyl-5-methoxy-2-phenoxy)titanium dichloride, dimethylsilyl (trimethylsilylcyclopentadienyl)(3-tert-butyl-5-chloro-2-phenoxy)titanium dichloride, dimethylsilyl (trimethylsilylcyclopentadienyl)(3,5-diamyl-2-phenoxy) titanium dichloride, dimethylsilyl(indenyl)(2-phenoxy) titanium dichloride, dimethylsilyl(indenyl)(3-methyl-2-phenoxy)titanium dichloride, dimethylsilyl(indenyl)(3,5-dimethyl-2-phenoxy)titanium dichloride, dimethylsilyl (indenyl)(3-tert-butyl-2-phenoxy)titanium dichloride, dimethylsilyl(indenyl)(3-tert-butyl-5-methyl-2-phenoxy)

titanium dichloride, dimethylsilyl(indenyl)(3,5-di-tert-butyl-2-phenoxy)titanium dichloride, dimethylsilyl(indenyl)(5-methyl-3-phenyl-2-phenoxy)titanium dichloride, dimethylsilyl(indenyl)(3-tert-butyldimethylsilyl-5-methyl-2-phenoxy)titanium dichloride, dimethylsilyl(indenyl)(5-methyl-3-trimethylsilyl-2-phenoxy)titanium dichloride, dimethylsilyl(indenyl)(3-tert-butyl-5-methoxy-2-phenoxy)titanium dichloride, dimethylsilyl(indenyl)(3-tert-butyl-5-chloro-2-phenoxy)titanium dichloride, dimethylsilyl(indenyl)(3,5-diamyl-2-phenoxy)titanium dichloride, dimethylsilyl(fluorenyl)(2-phenoxy)titanium dichloride, dimethylsilyl(fluorenyl)(3-methyl-2-phenoxy)titanium dichloride, dimethylsilyl(fluorenyl)(3,5-dimethyl-2-phenoxy)titanium dichloride, dimethylsilyl(fluorenyl)(3-tert-butyl-2-phenoxy)titanium dichloride, dimethylsilyl(fluorenyl)(3-tert-butyl-5-methyl-2-phenoxy)titanium dichloride, dimethylsilyl(fluorenyl)(3,5-di-tert-butyl-2-phenoxy)titanium dichloride, dimethylsilyl(fluorenyl)(5-methyl-3-phenyl-2-phenoxy)titanium dichloride, dimethylsilyl(fluorenyl)(3-tert-butyldimethylsilyl-5-methyl-2-phenoxy)titanium dichloride, dimethylsilyl(fluorenyl)(5-methyl-3-trimethylsilyl-2-phenoxy)titanium dichloride, dimethylsilyl(fluorenyl)(3-tert-butyl-5-methoxy-2-phenoxy)titanium dichloride, dimethylsilyl(fluorenyl)(3-tert-butyl-5-chloro-2-phenoxy)titanium dichloride, dimethylsilyl(fluorenyl)(3,5-diamyl-2-phenoxy)titanium dichloride, dimethylsilyl(fluorenyl)(1-naphtoxy-2-yl) titanium dichloride, etc., transition metal complexes wherein B in the chemical formula [I] is an atom of the group XIV in the Periodic Table of the elements other than the carbon atoms, such as compounds wherein cyclopentadienyl of these compounds is replaced by dimethylcyclopentadienyl, trimethylcyclopentadienyl, ethylcyclopentadienyl, n-propylcyclopentadienyl, isopropylcyclopentadienyl, sec-butylcyclopentadienyl, isobutylcyclopentadienyl, tert-butyldimethylsilylcyclopentadienyl, phenylcyclopentadienyl, methylindenyl and phenylindenyl, compounds wherein 2-phenoxy of these compounds is replaced by 3-phenyl 2-phenoxy, 3-trimethyl-2-phenoxy and 3-tert-butyldimethylsilyl-2-phenoxy, compounds wherein dimethylsilyl of these compounds is replaced by diethylsilyl, diphenylsilyl and dimethoxysilyl, compounds wherein titanium of these compounds is replaced by zirconium and hafnium, and compounds wherein chloride of these compounds is replaced by bromide, iodide, dimethylamide, diethylamide, n-butoxide and isopropoxide.

The transition metal complex represented by the above general formula (1) can be synthesized, for example, by the following method.

First, a compound having a structure that a group having a cyclopentadiene skeleton and a group having an alkoxybenzene skeleton are linked through an atom of the group XIV is obtained by reacting an alkoxybenzene compound halogenated at the ortho-position with a cyclopentadiene compound substituted with a halogenated atom of the group XIV in the presence of an organic alkali metal or metal magnesium. A transition metal complex represented by the above general formula (1) can be synthesized by treating the compound with a base and reacting with a halide, a hydrocarbon compound or a hydrocarbon oxy compound of a transition metal.

The catalyst is obtainable by using the above transition metal complex and the following compound (B), or by using the above transition metal complex, the following compound (B) and the following compound (C).

Organoaluminum Compound (B)

As the compound (B), known organoaluminum compounds can be used. Preferable examples include any one of (B1) organoaluminum compound represented by the general formula $E^1_a AlZ_{3-a}$, (B2) cyclic aluminoxane having a structure represented by the general formula $\{-Al(E^2)-O-\}_b$ and (B3) linear aluminoxane having a structure represented by the general formula $E^3\{-Al(E^3)-O-\}_c AlE^3_2$ (wherein $E^1$ to $E^3$ respectively represent a hydrocarbon group having carbon atoms of 1–8 and all of $E^1$, $E^2$ and $E^3$ may be the same or different; Z represents a hydrogen atom or a halogen atom and all of Z may be the same or different; a is a numeral which satisfies $0<a\leq 3$; b represents an integer of not less than 2; and c represents an integer of not less than 1) or a mixture of two or more kinds of them.

Specific examples of the organoaluminum compound (B1) represented by the general formula $E^1_a AlZ_{3-a}$ include trialkylaluminum such as trimethylaluminum, triethylaluminum, tripropylaluminum, triisobutylaluminum, trihexylaluminum, etc.; dialkylaluminum chloride such as dimethylaluminum chloride, diethylaluminum chloride, dipropylaluminum chloride, diisobutylaluminum chloride, dihexylaluminum chloride, etc.; alkylaluminum dichloride such as methylaluminum dichloride, ethylaluminum dichloride, propylaluminum dichloride, isobutylaluminum dichloride, hexylaluminum dichloride, etc.; and dialkylaluminum hydride such as dimethylaluminum hydride, diethylaluminum hydride, dipropylaluminum hydride, diisobutylaluminum hydride, dihexylaluminumhydride, etc. Among them, trialkylaluminum is preferable, and triethylaluminum and triisobutylaluminum are more preferable.

Specific examples of $E^2$ and $E^3$ in the cyclic aluminoxane (B2) having a structure represented by the general formula $\{-Al(E^2)-O-\}_b$ and linear aluminoxane (A3) having a structure represented by the general formula $E^3\{-Al(E^3)-O-\}_c AlE^3_2$ include alkyl groups such as methyl group, ethyl group, normal propyl group, isopropyl group, normal butyl group, isobutyl group, normal pentyl group, neopentyl group and the like. b is an integer of not less than 2, and c is an integer of not less than 1. Preferably, $E^2$ and $E^3$ are methyl groups or isobutyl groups, b is 2 to 40 and c is 1 to 40.

The above aluminoxane is produced by various methods. The method is not specifically limited, and the aluminoxane may be produced by per se known methods. For example, it is produced by bringing a solution, prepared by dissolving a trialkylaluminum (e.g. trimethylaluminum, etc.) in a suitable solvent (e.g. benzene, aliphatic hydrocarbon, etc.), into contact with water. There can also be used a method of bringing a trialkylaluminum (e.g. trimethylaluminum, etc.) into contact with a metal salt containing crystallization water (e.g. copper sulfate hydrate, etc.).

Compound (C)

As the compound (C), any one of (C1) boron compound represented by the general formula $BQ^1Q^2Q^3$, (C2) boron compound represented by the general formula $G^+(BQ^1Q^2Q^3Q^4)^-$ and (C3) boron compound represented by the general formula $(L-H)^+(BQ^1Q^2Q^3Q^4)^-$ can be used.

In the boron compound (C1) represented by the general formula $BQ^1Q^2Q^3$, B represents a trivalent boron atom in the valence state; and $Q^1$ to $Q^3$ may be the same or different and represent a halogen atom, a hydrocarbon atom having carbon atoms of 1–20, a halogenated hydrocarbon atom having carbon atoms of 1–20, a substituted silyl group having carbon atoms of 1–20, a alkoxy group having carbon atoms of 1–20 or an amino group having carbon atoms of 2–20. Preferably, $Q^1$ to $Q^3$ represent a halogen atom, a hydrocarbon group having carbon atoms of 1–20 or a halogenated hydrocarbon atom having carbon atoms of 1–20.

Specific examples of the compound (C1) include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenylbis(pentafluorophenyl)borane, etc. Among them, tris(pentafluorophenyl)borane is most preferable.

In the boron compound (C2) represented by the general formula $G^+(BQ^1Q^2Q^3Q^4)^-$, $G^+$ represents an inorganic or organic cation; B represents a trivalent boron in the valence state; and $Q^1$ to $Q^4$ are the same as $Q^1$ to $Q^3$ in the above (C1).

In the compound represented by the general formula $G^+(BQ^1Q^2Q^3Q^4)^-$, specific examples of $G^+$ as an inorganic cation include ferrocenium cation, alkyl-substituted ferrocenium cation, silver cation, etc. and specific examples of $G^+$ as an organic cation include triphenylmethyl cation, etc. Among them, carbenium cation is preferable. Examples of $(BQ^1Q^2Q^3Q^4)^-$ include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,2,4-trifluorophenyl)borate, phenylbis(pentafluorophenyl)borate, tetrakis(3,5-bistrifluorophenylmethyl)borate and the like.

Examples of the specific combination of them include ferrocenium tetrakis(pentafluorophenylborate, 1,1'-dimethylferrocenium tetrakis(pentafluorophenyl)borate, silver tetrakis(pentafluorophenyl)borate, triphenylmethyltetrakis(pentafluorophenyl)borate, triphenylmethyltetrakis(3,5-bistrifluorophenyl)borate and the like. Among them, triphenyltetrakis(pentafluorophenyl)borate is most preferable.

In the compound (C3) represented by the general formula $(L-H)^+(BQ^1Q^2Q^3Q^4)^-$, L represents a neutral Lewis base; $(L-H)^+$ represents a Brønsted acid; B represents a trivalent boron in the valence state; and $Q^1$ to $Q^4$ are the same as $Q^1$ to $Q^3$ in the above Lewis acid (C1).

In the compound represented by the general formula $(L-H)^+(BQ^1Q^2Q^3Q^4)^-$, specific examples of $(L-H)^+$ as Brønsted acid include trialkyl-substituted ammonium, N,N-dialkylanilinium, dialkylammonium, triarylphosphonium, etc. and specific examples of $(BQ^1Q^2Q^3Q^4)^-$ include the same one as that described above.

Examples of the specific combination of them include triethylammonium tetrakis(pentafluorophenyl)borate, tripropylammonium tetrakis(pentafluorophenyl)borate, tri(normalbutyl)ammonium tetrakis(pentafluorophenyl)borate, tri(normalbutyl)ammonium tetrakis(3,5-bistrifluorophenyl)borate, N,N-dimethylanilium tetrakis(pentafluorophenyl)borate, N,N-diethylanilium tetrakis(pentafluorophenyl)borate, N,N-2,4,6-pentamethylanilium tetrakis(pentafluorophenyl)borate, N,N-dimethylanilium tetrakis(3,5-bistrifluoromethylphenyl)borate, disiopropylammonium tetrakis(pentafluorophenyl)borate, dicyclohexylammonium tetrakis(pentafluorophenyl)borate, triphenylphosphonium tetrakis(pentafluorophenyl)borate, tri(methylphenyl)phosphonium tetrakis(pentafluorophenyl)borate, tri(dimethylphenyl)phosphonium tetrakis(pentafluorophenyl)borate, etc. Among them, tri(normalbutyl)ammonium tetrakis(pentafluorophenyl)borate or N,N-dimethylanilinium tetrakis(pentafluorophenyl)borate is most preferable.

In the present invention, the transition metal complex represented by the general formula (1) and compound (B) and/or compound (C) can be used by charging in arbitrary order on polymerization, but the reaction product obtained by previously contacting the combination of arbitrary compounds may be used.

It is desirable that each catalyst component is used so that a molar ratio of the compound (B) to the transition metal complex is from 0.1 to 10000, preferably from 5 to 2000, and a molar ratio of the compound (C) to the transition metal complex is from 0.1 to 100, preferably from 0.5 to 10. Regarding a concentration of each catalyst component used in the state of a solution, it is desirable that each component is generally used so that an amount of the transition metal complex represented by the general formula (1) is from 0.0001 to 5 mmol/l, preferably from 0.001 to 1 mmol/l, an amount of the compound (B) is from 0.01 to 500 mmol/l, preferably from 0.1 to 100 mmol/l in terms of Al atom, and an amount of the compound (C) is from 0.0001 to 5 mmol/l, preferably from 0.001 to 1 mmol/l.

The method of producing the copolymer of the present invention is not specifically limited. According to the method described in the specification of Japanese Patent Application No. 185081/1996, the copolymer can be produced by solution polymerization using an aliphatic hydrocarbon (e.g. butane, hexane, octane, etc.), a cyclic aliphatic hydrocarbon (cyclohexane, methyl cyclohexane, methyl cyclopentane, etc.), an aromatic hydrocarbon (e.g. benzene, toluene, xylene, etc.) or a halogenated hydrocarbon (e.g. methylene dichloride, dichloroethane, chlorobenzene, dichlorobenzene, etc.) as a solvent, slurry polymerization using liquid hydrocarbon or liquefied monomer as the solvent, and vapor phase polymerization in a gaseous monomer, etc. It is possible to use both continuous polymerization and batch polymerization. It is also possible to conduct the reaction in two or more stages by changing the reaction condition.

The above copolymerization reaction is generally decided by the kind of the desired polymer and reaction apparatus as described in Japanese Patent Application No. 185081/1996. For example, the polymerization temperature is within the range from −50 to 200° C., the polymerization time is within the range from 1 minute to 20 hours, and the polymerization pressure is within the range from normal pressure to 60 (kg/cm²).

The present invention relates to a novel copolymer comprising an ethylene-α-olefin-branched conjugated polyvalent olefin having narrow intermolecular composition distribution/molecular distribution, more particularly to a copolymer wherein the branched conjugated polyvalent olefin is isoprene, a crosslinking composition comprising the copolymer, and a crosslinked copolymer obtained by crosslinking the crosslinking composition. More particularly, it becomes possible to provide a crosslinking composition comprising the copolymer, which is capable of crosslinking at sufficiently fast crosslinking rate without using an expensive diene monomer and, furthermore, a crosslinked copolymer obtained by crosslinking the crosslinking copolymer, wherein the heat deterioration resistance is better than that of a crosslinked polymer obtained by using a current expensive diene monomer, and a novel copolymer which can be employed in the production thereof.

EXAMPLES

The present invention will now be illustrated by means of the following Examples, which should not be construed as a limitation upon the scope of the invention. The characteristics and physical properties of the polymer in the Examples were measured by the following method.

Viscosity [η]

The resulting copolymer (100 mg) was dissolved in 50 ml of tetralin at 135° C. and the viscosity was measured from the dropping rate of the tetralin solution in which the sample was dissolved, using an Ubbelohde viscometer provided in an oil bath maintained at 135° C.

Content of α-olefin in Copolymer

The α-olefin content in the resulting polymer was determined by an infrared absorption spectrum. According to the method described in the literature (e.g. characterization of polyethylene by infrared absorption spectrum, published by Takayama, Usami et al.), the α-olefin content was quantitatively determined by employing characteristic absorption derived from α-olefin, e.g. 1375 cm$^{-1}$ (propylene) and 772 cm$^{-1}$. The α-olefin content in Examples represents the α-olefin content in terms of the α-olefin content in total amount of ethylene and α-olefin.

Measurement of Diolefin Content Index (Iodine Value) in Copolymer

In the present invention, the iodine value determined by the titration method as described above was taken as the index of the polyvalent olefin content. As is described in a known literature (Rubber Test Method <Edition 2>, published by Japanese Rubber Society, pages 80–90), it is reported that the amount of unsaturated bonds in the polymer determined from the iodine value titration corresponds to the value determined by NMR in comparatively small error, and is taught that the iodine value can be used effectively as the index of the amount of the polyvalent olefin introduced into the polymer.

Measurement of Melting Point (Tm) and Glass Transition Point (Tg) of Copolymer

They were determined under the following conditions, using a differential scanning calorimeter (Seiko SSC-5200).

(Measurement of Tm) heating: from 40 to 150° C. (10° C./minute), maintaining for 5 minutes, cooling: from 150 to 10° C. (5° C./minute), maintaining for 10 minutes, measurement: The melting point (Tm) of the sample was determined by heating from 10 to 160° C. (5° C./minute).

(Measurement of Tg) After heating from normal temperature (25° C.) to 180° C. at a rate of 20° C./minute and maintaining at 180° C. for 2 minutes, this sample was cooled to −80° C. at a rate of −20° C./minute, maintained at −80° C. for 2 minutes. Thereafter, this sample was heated again at a rate of 20° C./minute and Tg of the sample was determined.

Molecular Weight Distribution

It was determined by gel permeation chromatography (150C, manufactured by Waters Co.) under the following conditions.

Column: TSK gel GMH-Ht, measuring temperature: 145° C., setting and measuring concentration: 10 mg/10 ml-ortho-dichlorobenzene.

Example 1

After repeating an operation of evacuating a 2 L glass separable flask equipped with a stirrer, a dropping funnel, a reflux condenser, a monomer feeding tube and a thermometer and replacing the atmosphere in the flask with a nitrogen gas three times, hexane (1 L) was charged under a nitrogen atmosphere and then continuous feeding of a mixed gas of an ethylene gas (8.8 L/minute), propylene gas (1.0 L/minute) and a hydrogen gas (0.2 L/minute) through the monomer feeding tube was initiated. After the initiation of feeding of the monomer and the inner temperature (0° C.) of the flask became stable, 0.50 mmol of triisobutylaluminum (1 mmol hexane solution) and 0.002 mmol of dimethylsilyl (tetramethylcyclopentadienyl)(3-tert-butyl-5-methyl-2-phenoxy)titanium dichloride (described in Example 25 of Japanese Patent Application No. 185081/1996) dissolved in 10 ml of hexane were charged through the dropping funnel. Then, 0.010 mmol of triphenylcarbenium tetrakis (pentafluorophenyl)borate (manufactured by Asahi Glass Co., Ltd.) dissolved in 10 ml of toluene and 50 mmol of isoprene were simultaneously added through each dropping funnels and the polymerization was initiated. During the polymerization reaction, the flask was cooled down by the ice/water mixed bath. Polymerization was stopped by adding 10 ml of ethanol through the dropping funnel after 30 minutes, and then polymer dissolved in hexane was recovered by evaporating the hexane from the reaction mixture followed by the successive precipitation by pouring the concentrates into the excess amount of methanol. And after drying this wet polymer under vacuum, 26.84 g of a copolymer was obtained. As a result of the analysis, the resulting copolymer was a copolymer having a propylene content of 45.4% by weight, an iodine value (determined by titration) of 9.2 (g/100 g), [η] (as a measure of molecular weight) of 1.66 and a narrow molecular weight distribution (determined by GPC) Mw/Mn of 1.87. In the infrared spectrum of this copolymer, absorption at 889 cm$^{-1}$, which is assumed to be derived from an isopropenyl group of copolymerized isoprene, and absorptions at 1676 cm$^{-1}$ and 1646 cm$^{-1}$, which are assumed to be double-bonds derived from isoprene were recognized. Furthermore, Tg determined by DSC was −54.3° C.

Example 2

According to the same manner as that described in Example 1 except for changing the amount of the titanium compound, triisobutylaluminum, triphenylcarbeniumtetrakis (pentafluorophenyl)borate and isoprene to 0.004 mmol, 1.0 mmol, 0.02 mmol and 250 mmol, respectively, the polymerization was conducted. As a result, 34.81 g of a copolymer was obtained. The propylene content was 49.6% by weight, the iodine value was 35.9 (g/100 g) and [η] was 1.74.

Example 3

According to the same manner as that described in Example 1 except for changing the feeding amount of the ethylene gas, propylene gas, hydrogen gas and isoprene to 8.0 (L/minute), 0.12 (L/minute), 0.50 (L/min) and 25 mmol, respectively, 10.67 g of a copolymer was obtained. The copolymer was a crystalline copolymer having [η] of 1.18, an iodine value of 14.4, Mw/Mn of 1.85 and one melt peak at 94.7° C. in the DSC measurement. In the infrared absorption spectrum, peaks at 1667 cm$^{-1}$, 1646 cm$^{-1}$ and 889 cm$^{-1}$ were recognized.

Example 4

According to the same manner as that described in Example 3 except for changing the amount of isoprene to 50 mmol, the copolymerization was conducted. As a result, 12.1 g of a copolymer was obtained. The copolymer was a crystalline copolymer having [η] of 0.92, an iodine value of 24.0, Mw/Mn of 2.13 and one broad melt peak at 90.5° C. in the DSC measurement. In the infrared absorption spectrum, peaks at 1667 cm$^{-1}$, 1646 cm$^{-1}$ and 889 cm$^{-1}$ were recognized.

Comparative Example 1

According to the same manner as that described in Example 1 except for using 8 mmol of 5-ethylidne-2-norbornene (ENB) in place of isoprene, adjusting the polymerization temperature to 30° C. and using the ethylene gas (8.0 L/minute), propylene gas (2.0 L/minute), hydrogen gas (0 L/minute), titanium compound (0.001 mmol), triphenylcarbeniumtetrakis (pentafluorophenyl)borate (0.003 mmol) and triisobutylaluminum (0.25 mmol), the copolymerization was carried out. As a result, 1.7 g of a copolymer was obtained. The copolymer had a propylene content of 42.6% by weight, an iodine value of 14.3 and [η] of 5.49. In the infrared absorption spectrum, absorption at 1688 cm$^{-1}$ derived from an ethylidene double bond derived from ENB was recognized but absorptions at 1667 cm$^{-1}$, 1646 cm$^{-1}$ and 889 cm$^{-1}$ were not recognized.

Comparative Example 2

According to the same manner as that described in Example 3 except for changing the feeding amount of the ethylene gas, propylene gas, hydrogen gas and isoprene to 8.0 (L/minute), 0.12 (L/minute), 0.50 (L/min) and 0 mmol, respectively, the copolymerization was conducted. As a result, 6.84 g of a copolymer was obtained. The copolymer was a copolymer having [η] of 2.71, Mw/Mn of 1.97 and one melt peak at 102.3° C. in the DSC measurement. In the infrared absorption spectrum, peaks at 1667 cm$^{-1}$, 1646 cm$^{-1}$ and 889 cm$^{-1}$ were not recognized.

Comparative Example 3

Copolymerization of ethylene-propylene-isoprene using dimethylsilyl(tetramethylcyclopentadienyl)(N-tert-butylamino)titanium dichloride according to the same manner as that described in Example 1 except for using dimethylsilyl(tetramethylcyclopentadienyl)(N-tert-butyl-amino)titanium dichloride in place of dimethylsilyl (tetramethylcyclopentadienyl)(3-tert-butyl-5-methyl-2-phenoxy)titanium dichloride, the copolymerization of ethyelene, propylene and isoprene was carried out. In this Example, any copolymer was not produced.

Example 5

Evaluation of Physical Properties of Copolymer

In the evaluation of the physical properties of the copolymer of the present invention, a sample for measuring was prepared according to the following procedure. The measurement of the compound ML viscosity was carried out according to JIS-K6300, and the tensile test and measurement of the hardness were carried out according to JIS K-6301. The measurement of the vulcanization rate was carried out under the condition of 170° C. using an oscillating disc rheometer (ODR, manufactured by Toyo Seiki Co.) according to ASTM-2705-68T.

In Table 1, physical properties of copolymers having the composition described in the table and respectively containing isoprene (Example A) and ENB (Comparative Example A), which were synthesized in a large amount with reference to the conditions of Example 1 and Comparative Example 1, and commercially available EPDM (Comparative Example B) (containing ENB as a Sumitomo Esprene E502-diene component) are shown.

Preparation of Crosslinking Copolymer and Crosslinking Method 100 parts by weight of a polymer, 50 parts by weight of Ceast SO (carbon black, manufactured by Tokai Carbon Co.), 15 parts by weight of Diana PW-90 (paraffin processing oil, manufactured by Idemitsu Kosan Co.), 5 parts by weight of ZnO, 1 part by weight of stearic acid, 1.0 part by weight of Sokusinol TS (vulcanization accelerator, manufactured by Sumitomo Chemical Industries Co., Ltd.), 0.25 part by weight of Soxinol M (vulcanization accelerator, manufactured by Sumitomo Chemical Industries Co., Ltd.) and 1.0 part by weight of sulfur were kneaded to prepare a crosslinking copolymer composition. Then, the resulting crosslinking composition was crosslinked at 160° C. for 30 minutes, using a press vulcanizing apparatus.

TABLE 1

Results of the measurement of physical properties
Data list of the evaluation of physical properties

| Sample | Example A | Comparative example A | Comparative example B E-502 |
|---|---|---|---|
| Kind of polyvalent olefin | Isoprene | ENB | ENB |
| Comp'd ML1-+4 100° C. | 72 | 73 | 86 |
| C'3 content (% by weight) | 46 | 48 | 43 |
| Iodine value (g/100 g) | 10.5 | 12.0 | 8.5 |
| Tensile physical properties | | | |
| M200 (kgf/cm$^2$) | 58 | 58 | 70 |
| Hardness (JIS-A) | 72 | 67 | 68 |
| Heat deterioration resistance (150° C., 72 hours) | | | |
| M200 retention (%) | 103 | 200 | 190 |
| EB retention (%) | 72 | 56 | 61 |
| ODR results (crosslinking characteristics) | | | |
| MH (kgf-cm) | 58.4 | 62.2 | 55.0 |
| ML (kgf-cm) | 5.2 | 5.3 | 7.8 |
| t'c10 (min) | 5.3 | 4.5 | 4.9 |
| t'c50 (min) | 7.8 | 6.7 | 7.1 |
| t'c90 (min) | 12.8 | 12.0 | 11.7 |

What is claimed is:

1. A random copolymer comprising monomer units of ethylene, an α-olefin and a branched conjugated polyvalent olefin, wherein said random copolymer has 0<ethylene monomer units<100 (% by mol), 0<α-olefin monomer units<100 (% by mol); an iodine value whereby 0<iodine value<370 (g/100 g), an intrinsic viscosity (η) measured in decahydronaphthalene at 135° C. which satisfies the following:

0.1 (dl/g)<η<10 (dl/g);

and a molecular weight distribution (Mw/Mn)≦5, wherein the α-olefin monomer is at least one aliphatic unsaturated hydrocarbon having 3–10 carbon atoms; and wherein the copolymer is obtained by copolymerizing the monomer units of ethylene, α-olefin and the branched conjugated polyvalent olefin using, as a catalyst, a complex of the group 4 transition metal.

2. A random copolymer comprising monomer units of ethylene, an α-olefin and a branched conjugated polyvalent olefin, wherein said random copolymer has 0<ethylene monomer units<100 (% by mol), 0<α-olefin monomer units<100 (% by mol); an iodine value whereby 0<iodine value<370 (g/100 g), an intrinsic viscosity (η) measured in decahydronaphthalene at 135° C. which satisfies the following:

0.1 (dl/g)<η<10 (dl/g);

and a molecular weight distribution (Mw/Mn)≦5, wherein the α-olefin monomer is at least one selected from the group consisting of propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4-4-dimethyl-1-pentene, 4-ethyl-1-hexene, 3-ethyl-1-hexene, 1-octene, and 1-decene; and wherein the copolymer is obtained by copolymerizing the monomer units of ethylene, α-olefin and the branched conjugated polyvalent olefin using, as a catalyst, a complex of the group 4 transition metal.

3. A method for producing a random copolymer comprised of monomer units of ethylene, an α-olefin and a branched conjugated polyvalent olefin, wherein said random copolymer has 0<ethylene monomer units<100 (% by mol) and, 0<α-olefin monomer units<100 (% by mol); an iodine value whereby 0<iodine value<370 (g/100 g); an intrinsic viscosity (η) measured in decahydronaphthalene at 135° C. which satisfies the following:

0.1 (dl/g)<η<10 (dl/g);

and a molecular weight distribution (Mw/Mn)≦5, said method comprising copolymerizing ethylene, the α-olefin and the branched conjugated polyvalent olefin using, as a catalyst, a compound (A) represented by the following general formula (1)

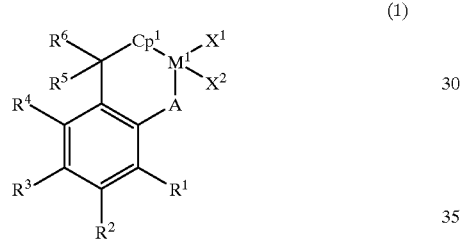

wherein $M^1$ represents a transition metal atom of the group 4 in the Periodic Table of the Elements;

A represents an atom of the group 16 in the Periodic Table of the Elements;

B represents an atom of the group 14 in the Periodic Table of the Elements;

$Cp^1$ represents a group having a cyclopentadiene anion skeleton;

$X^1$, $X^2$, $R^1$, $R^2$, $R^3$, $R^4$, $R^5$ and $R^6$ independently represent a hydrogen atom, a halogen atom, an alkyl group having carbon atoms of 1–20 which may be substituted with a halogen atom, an aralkyl group having carbon atoms of 7–20 which may be substituted with a halogen atom, an aryl group which may be substituted with a halogen atom having carbon atoms of 6–20, a substituted silyl group having carbon atoms of 1–20 which may be substituted with a halogen atom, an alkoxy group having carbon atoms of 1–20 which may be substituted with a halogen atom, an aralkyloxy group having carbon atoms of 7–20 which may be substituted with a halogen atom, an aryloxy group having carbon atoms of 6–20 which may be substituted with a halogen atom, or a disubstituted amino group having carbon atoms of 2–20; and $R^1$, $R^2$, $R^3$, $R^4$, $R^5$ and $R^6$ may be combined optionally to form a ring.

4. A method for producing a random copolymer comprised of monomer units of ethylene, an α-olefin and a branched conjugated polyvalent olefin, wherein said random copolymer has 0<ethylene monomer units<100 (% by mol), 0<α-olefin monomer units<100 (% by mol); an iodine value whereby 0<iodine value<370 (g/100 g), an intrinsic viscosity (η) measured in decahydronaphthalene at 135° C. which satisfies the following:

0.1 (dl/g)<η<10 (dl/g);

and a molecular weight distribution (Mw/Mn)≦5, said method comprising copolymerizing ethylene, the α-olefin and the branched conjugated polyvalent olefin using, as a catalyst, a compound (A) represented by the following general formula (1)

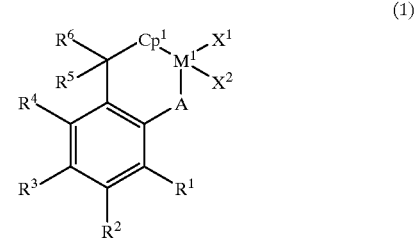

wherein $M^1$ represents a transition metal atom of the group 4 in the Periodic Table of the Elements;

A represents an atom of the group 16 in the Periodic Table of the Elements;

B represents an atom of the group 14 in the Periodic Table of the Elements;

$Cp^1$ represents a group having a cyclopentadiene anion skeleton;

$X^1$, $X^2$, $R^1$, $R^2$, $R^3$, $R^4$, $R^5$ and $R^6$ independently represent a hydrogen atom, a halogen atom, an alkyl group having carbon atoms of 1–20 which may be substituted with a halogen atom, an aralkyl group having carbon atoms of 7–20 which may be substituted with a halogen atom, an aryl group which may be substituted with a halogen atom having carbon atoms of 6–20, a substituted silyl group having carbon atoms of 1–20 which may be substituted with a halogen atom, an alkoxy group having carbon atoms of 1–20 which may be substituted with a halogen atom, an aralkyloxy group having carbon atoms of 7–20 which may be substituted with a halogen atom, an aryloxy group having carbon atoms of 6–20 which may be substituted with a halogen atom, or a disubstituted amino group having carbon atoms of 2–20; and $R^1$, $R^2$, $R^3$, $R^4$, $R^5$ and $R^6$ may be combined optionally to form a ring, and at least one of compounds of the following general formulas (B1) to (B3) or a mixture of two to three kinds of them:

(B1) an organoaluminum compound represented by the general formula $E^1{}_a Al Z_{3-a}$ (B2) a cyclic aluminoxane having a structure represented by the general formula $E^3\{-Al(E^3)-O-\}_c Al E^3{}_2$ (B3) a linear aluminoxane having a structure represented by the general formula $E^3\{-Al(E^3)-O-\}_c Al E^3{}_2$ wherein $E^1$ to $E^3$ respectively represent a hydrocarbon group having carbon atoms of 1–8 and all of $E^1$, $E^2$ and $E^3$ may be the same or different;

Z represents a hydrogen atom or a halogen atom and all of Z may be the same or different;

a represents a number of 0 to 3;
b represents an integer of not less than 2; and
c represents an integer of not less than 1.

5. A method for producing a random copolymer comprised of monomer units of ethylene, an α-olefin and a branched conjugated polyvalent olefin,
wherein said random copolymer has 0<ethylene monomer units<100 (% by mol), 0<α-olefin monomer units<100 (% by mol); an iodine value whereby 0<iodine value<370 (g/100 g), an intrinsic viscosity (η) measured in decahydronaphthalene at 135° C. which satisfies the following:
0.1 (dl/g)<η<10 (dl/g);
and a molecular weight distribution (Mw/Mn)≦5, said method comprising copolymerizing ethylene, the α-olefin and the branched conjugated polyvalent olefin using, as a catalyst, the compound (A) of represented by the following general formula (1)

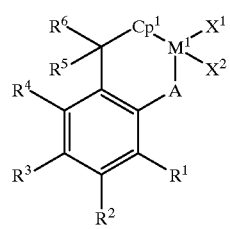

(1)

wherein
$M^1$ represents a transition metal atom of the group 4 in the Periodic Table of the Elements;
A represents an atom of the group 16 in the Periodic Table of the Elements;
B represents an atom of the group 14 in the Periodic Table of the Elements;
$Cp^1$ represents a group having a cyclopentadiene anion skeleton;
$X^1$, $X^2$, $R^1$, $R^2$, $R^3$, $R^4$, $R^5$ and $R^6$ independently represent a hydrogen atom, a halogen atom, an alkyl group having carbon atoms of 1–20 which may be substituted with a halogen atom, an aralkyl group having carbon atoms of 7–20 which may be substituted with a halogen atom, an aryl group which may be substituted with a halogen atom having carbon atoms of 6–20, a substituted silyl group having carbon atoms of 1–20 which may be substituted with a halogen atom, an alkoxy group having carbon atoms of 1–20 which may be substituted with a halogen atom, an aralkyloxy group having carbon atoms of 7–20 which may be substituted with a halogen atom, an aryloxy group having carbon atoms of 6–20 which may be substituted with a halogen atom, or a disubstituted amino group having carbon atoms of 2–20; and
$R^1$, $R^2$, $R^3$, $R^4$, $R^5$ and $R^6$ may be combined optionally to form a ring, and at least one compound of the following general formulas (B1) to (B3) or a mixture of two to three kinds of them:
(B1) an organoaluminum compound represented by the general formula $E^1_a AlZ_{3-a}$
(B2) a cyclic aluminoxane having a structure represented by the general formula $\{-Al(E^2)-O-\}_b$
(B3) a linear aluminoxane having a structure represented by the general formula $E^3\{-Al(E^3)-O-\}_c AlE^3_2$ wherein $E^1$ to $E^3$ respectively represent a hydrocarbon group having carbon atoms of 1–8 and all of $E^1$, $E^2$ and $E^3$ may be the same or different;
Z represents a hydrogen atom or a halogen atom and all of Z may be the same or different;
a represents a number of 0 to 3;
b represents an integer of not less than 2; and
c represents an integer of not less than 1, and
at least one compound of the following general formulas (C1) to (C3):
(C1) a boron compound represented by the general formula $BQ^1Q^2Q^3$
(C2) a boron compound represented by the general formula $G^+(BQ^1Q^2Q^3Q^4)^-$ wherein
B represents a trivalent boron atom in the valence state;
$Q^1$ to $Q^4$ respectively represent a halogen atom, a hydrocarbon group having carbon atoms of 1–20, a halogenated hydrocarbon group having carbon atoms of 1–20, a substituted silyl group having carbon atoms of 1–20, an alkoxy group having carbon atoms of 1–20 or an amino group having carbon atoms of 2–20 and may be the same or different;
$G^+$ represents an inorganic or organic cation;
L represents a neutral Lewis base; and
$(L-H)^+$ represents a brønsted acid.

6. The method for producing a random copolymer according to any of claims 3–5, wherein the branched conjugated polyvalent olefin is isoprene.

7. The random copolymer according to claim 1 or claim 2, wherein the branched conjugated polyvalent olefin is isoprene.

8. The method for producing a random copolymer according to any of claims 3–5, wherein the α-olefin monomer content satisfies 20<α-olefin<100% by mol.

9. The random copolymer according to claim 1 or claim 2, wherein the α-olefin monomer content satisfies 20<α-olefin<100% by mol.

10. The method for producing a random copolymer according to any of claims 3–5, wherein the molecular weight distribution Mw/Mn is not more than 3.5.

11. The random copolymer according to claim 1 or claim 2, wherein the molecular weight distribution Mw/Mn is not more than 3.5.

12. A copolymer composition comprising the copolymer produced by the method of any of claims 3–5.

13. A copolymer composition comprising the copolymer of claim 1 or claim 2.

14. A crosslinking copolymer composition comprising the copolymer produced by the method of claim 3, and at least one crosslinking agent.

15. A crosslinked copolymer composition which is obtained by crosslinking the crosslinking copolymer composition of claim 14.

16. A crosslinking copolymer composition comprising the copolymer produced by the method of claim 4, and at least one crosslinking agent.

17. A crosslinked copolymer composition which is obtained by crosslinking the crosslinking copolymer composition of claim 16.

18. A crosslinking copolymer composition comprising the copolymer produced by the method of claim 5, and at least one crosslinking agent.

19. A crosslinked copolymer composition which is obtained by crosslinking the crosslinking copolymer composition of claim 18.

20. A crosslinking copolymer composition comprising the copolymer of claim 1, and at least one crosslinking agent.

21. A crosslinked copolymer composition which is obtained by crosslinking the crosslinking copolymer composition of claim 20.

22. A crosslinking copolymer composition comprising the copolymer of claim 2, and at least one crosslinking agent.

23. A crosslinked copolymer composition which is obtained by crosslinking the crosslinking copolymer composition of claim 22.

24. The copolymer produced by the method of any of claims 3–5, wherein the branched conjugated polyvalent olefin monomer is at least one selected from the group consisting of 2-methyl-1,3-butadiene, 2-ethyl-1,3-butadiene, 2-propyl-1,3-butadiene, 2-isopropyl-1,3-butadiene, 2-hexyl-1,3-butadiene, 2-3-dimethyl-1,3-butadiene, 2,3-diethyl-1,3-butadiene, 2-methyl-1,3-pentadiene, 2-methyl-1,3-hexadiene, 2-methyl-1,3-octadiene, 2-methyl-1,3-deadiene, 2,3-dimethyl-1,3-pentadiene, 2,3-dimethyl-1,3-hexadiene, 2,3-dimethyl-1,3-octadiene, 2,3-dimethyl-1,3-decadiene, 2-methyl-1,3-cyclopentadiene, 2-methyl-1,3-cyclohexadiene, 2,3-dimethyl-1,3-cyclopentadiene, 2,3-dimethyl-1,3-cyclohexadiene, 2-chloro-1,3-butadiene, 2,3-dichloro-1,3-butadiene, 1-fluoro-1,3-butadiene, 2-chloro-1,3-cyclopentadiene, 2-chloro-1,3-pentadiene, 2-chloro-1,3-cyclopentadiene, and 2-chloro-1,3-cyclohexadiene.

25. The random copolymer of claim 1 or claim 2, wherein the branched conjugated polyvalent olefin monomer is at least one selected from the group consisting of 2-methyl-1,3-butadiene, 2-ethyl-1,3-butadiene, 2-propyl-1,3-butadiene, 2-isopropyl-1,3-butadiene, 2-hexyl-1,3-butadiene, 2-3-dimethyl-1,3-butadiene, 2,3-diethyl-1,3-butadiene, 2-methyl-1,3-pentadiene, 2-methyl-1,3-hexadiene, 2-methyl-1,3-octadiene, 2-methyl-1,3-deadiene, 2,3-dimethyl-1,3-pentadiene, 2,3-dimethyl-1,3-hexadiene, 2,3-dimethyl-1,3-octadiene, 2,3-dimethyl-1,3-decadiene, 2-methyl-1,3-cyclopentadiene, 2-methyl-1,3-cyclohexadiene, 2,3-dimethyl-1,3-cyclopentadiene, 2,3-dimethyl-1,3-cyclohexadiene, 2-chloro-1,3-butadiene, 2,3-dichloro-1,3-butadiene, 1-fluoro-1,3-butadiene, 2-chloro-1,3-cyclopentadiene, 2-chloro-1,3-pentadiene, 2-chloro-1,3-cyclopentadiene, and 2-chloro-1,3-cyclohexadiene.

* * * * *